United States Patent
Coleman et al.

(10) Patent No.: US 9,360,383 B2
(45) Date of Patent: Jun. 7, 2016

(54) SYSTEM AND METHOD TO MEASURE FORCE OR LOCATION ON AN L-BEAM

(71) Applicants: Nate J. Coleman, Murrieta, CA (US); Michael A. Long, Rolling Hills Estates, CA (US)

(72) Inventors: Nate J. Coleman, Murrieta, CA (US); Michael A. Long, Rolling Hills Estates, CA (US)

(73) Assignee: Nate J. Coleman and Aexius, LLC, Rolling Hills Estates, CA (US)

( * ) Notice: Subject to any disclaimer, the term of this patent is extended or adjusted under 35 U.S.C. 154(b) by 24 days.

(21) Appl. No.: 13/857,140

(22) Filed: Apr. 4, 2013

(65) Prior Publication Data

US 2014/0299389 A1    Oct. 9, 2014

(51) Int. Cl.
| | |
|---|---|
| *G01G 3/14* | (2006.01) |
| *G01G 19/40* | (2006.01) |
| *G01L 1/22* | (2006.01) |
| *G01B 21/16* | (2006.01) |

(52) U.S. Cl.
CPC .............. *G01L 1/2262* (2013.01); *G01B 21/16* (2013.01); *G01G 3/1404* (2013.01); *G01G 19/40* (2013.01); *G01L 1/2206* (2013.01)

(58) Field of Classification Search
CPC .... G01L 1/2262; G01L 1/2206; G01G 19/40; G01G 3/1404; B65G 41/00; G01B 21/16; G01B 7/00; G06F 3/0414; G06F 3/045
USPC ......................... 177/211, 229, 238
See application file for complete search history.

(56) References Cited

U.S. PATENT DOCUMENTS

| | | | |
|---|---|---|---|
| 2,597,751 A | | 5/1952 | Ruge |
| 2,935,213 A | * | 5/1960 | Cellitti et al. ............ 414/21 |
| 3,059,710 A | * | 10/1962 | Pien ................ 177/136 |
| 3,063,576 A | * | 11/1962 | Hofmeister ............ 414/21 |
| 3,114,531 A | * | 12/1963 | Weber ................ 248/242 |
| 3,526,130 A | * | 9/1970 | Canfield .......... B65H 59/385 |
| | | | 73/862.474 |
| 3,602,866 A | | 8/1971 | Saxl |
| 3,614,044 A | * | 10/1971 | Bard ................ 248/113 |
| 3,657,475 A | | 4/1972 | Peronneau et al. |
| 3,724,575 A | | 4/1973 | Kutsay |
| 3,927,560 A | * | 12/1975 | Farr .............. 73/862.633 |
| 3,990,032 A | | 11/1976 | Fish et al. |
| 4,065,962 A | * | 1/1978 | Shoberg ............ 73/862.628 |
| 4,121,049 A | | 10/1978 | Roeber |
| 4,128,001 A | * | 12/1978 | Marks ............... 73/1.15 |

(Continued)

FOREIGN PATENT DOCUMENTS

| | | | | |
|---|---|---|---|---|
| WO | WO 2011/017157 A1 | * | 2/2011 | ............ G01L 1/2262 |
| WO | WO 2014/186065 A2 | * | 11/2014 | ............ G01L 1/2262 |

*Primary Examiner* — Randy W Gibson
(74) *Attorney, Agent, or Firm* — Michael A. Long, Esq.; Aexius, LLC

(57) ABSTRACT

Force and location sensing systems and methods are disclosed. A method comprises bending a L-beam at an initially unknown location on a force-supporting portion of the L-beam, the L-beam substantially having a tension side and a compression side, measuring a first local stress at a first location on the tension side, measuring a second local stress at a second location on the tension side, measuring a third local stress at a third location on the compression side, and measuring a fourth local stress at a fourth location on the compression side. A weight-sensing storage system capable of tracking removed items is disclosed with a product image captured via a camera, a plurality of sensors on an L-beam, a first signal from the plurality of sensors indicating a first state prior to change of the product image, and a second signal indicating lower strain on the L-beam than the first signal.

5 Claims, 19 Drawing Sheets

(56) References Cited

U.S. PATENT DOCUMENTS

| | | | | |
|---|---|---|---|---|
| 4,233,837 A | * | 11/1980 | Canfield | B65H 59/40 73/862.474 |
| 4,340,777 A | | 7/1982 | DeCosta et al. | |
| 4,421,186 A | | 12/1983 | Bradley | |
| 4,423,640 A | | 1/1984 | Jetter | |
| 4,454,770 A | * | 6/1984 | Kistler | 73/862.633 |
| 4,476,946 A | | 10/1984 | Smith | |
| 4,530,245 A | | 7/1985 | Jacobson | |
| 4,657,097 A | * | 4/1987 | Griffen | 177/211 |
| 4,688,434 A | | 8/1987 | Cherbuy | |
| 4,747,456 A | | 5/1988 | Kitagawa et al. | |
| 4,785,896 A | * | 11/1988 | Jacobson | 177/211 |
| 4,788,930 A | | 12/1988 | Matteau et al. | |
| 4,848,493 A | * | 7/1989 | Hitchcock | 177/211 |
| 4,858,475 A | | 8/1989 | Jacobson | |
| 4,936,149 A | | 6/1990 | Jacobson | |
| 4,951,765 A | | 8/1990 | Naito et al. | |
| 5,154,247 A | * | 10/1992 | Nishimura et al. | 177/211 |
| 5,183,125 A | * | 2/1993 | Schurr | 177/211 |
| 5,209,313 A | | 5/1993 | Brodrick et al. | |
| 5,293,007 A | * | 3/1994 | Darst et al. | 177/229 |
| 5,510,581 A | | 4/1996 | Angel | |
| 5,623,128 A | | 4/1997 | Grimm et al. | |
| 5,714,695 A | | 2/1998 | Bruns | |
| 5,750,937 A | * | 5/1998 | Johnson et al. | 177/25.11 |
| 5,783,042 A | * | 7/1998 | Leeman et al. | 162/198 |
| 5,837,946 A | | 11/1998 | Johnson et al. | |
| 5,959,257 A | | 9/1999 | Campbell et al. | |
| 6,147,312 A | * | 11/2000 | Lockery | 177/211 |
| 6,313,414 B1 | | 11/2001 | Campbell | |
| 6,610,935 B1 | | 8/2003 | Siegl | |
| 7,040,455 B2 | | 5/2006 | Bogat | |
| 7,049,529 B2 | | 5/2006 | Vogel et al. | |
| 7,055,365 B2 | | 6/2006 | Yanagi | |
| 7,319,198 B2 | | 1/2008 | Kuchel et al. | |
| 8,022,835 B2 | | 9/2011 | Coleman | |
| 8,436,261 B2 | * | 5/2013 | Coleman | 177/136 |
| 2004/0140137 A1 | | 7/2004 | Selig et al. | |
| 2004/0200644 A1 | | 10/2004 | Paine et al. | |

* cited by examiner $$F_y = \frac{(\Delta_{53} - \Delta_{51})\,((a+b_1)/b_1)\,(1/12 b_0 h^3)}{a_1 * c_0}$$

$N_c$ = geometric constant (2202) of L-beam (100)

$S_0$ = sum (pair 202) + (pair 204)

$F_y = (b) * N_c$ $F = ((4 * S_0)^2 + F_y^2)^{0.5}$

DETERMINE UNKNOWN FORCE F (900)
2200

Receive unknown force (900) at unknown location $x$ (800) oriented along force-receiving portion (122) of L-beam (100)
2300

Sense tension stress value from sensors (51, 53) on L-beam (100) to derive a first stress output $t_1$
2302

Sense compression stress from sensors (52, 54) on L-beam (100) to derive second stress output $c_1$
2304

Apply knowns:
distance $d_1$ (300) is known
thickness $h_1$ (302) is known
quotient $q_1 = t_1 \div c_1$
2306

Approximate unknown location $x$ (800) oriented along force-receiving portion (122)
$x = ((t_1/q_1) * h_1)/d_1$
2308

Fig. 23

SYSTEM AND METHOD TO MEASURE FORCE OR LOCATION ON AN L-BEAM

CROSS-REFERENCE TO RELATED APPLICATIONS

This application is a continuation-in-part of U.S. patent application with Pub. No. 20060124365A1 and Ser. No. 11/010,161 to Coleman filed on Dec. 13, 2004, allowed on Jan. 4, 2013, which is incorporated by reference herein, including the file history of the aforementioned allowed patent application.

BACKGROUND OF THE INVENTION

1. Field of Invention

This invention relates to measurement systems involving force or location, in particular to strain-based systems where a force is exerted on an L-beam having an unknown location and/or an unknown force.

2. Description of the Related Art

Stress measurement systems are known in the related art; some non-exhaustive examples are U.S. Pat. Nos. 2,597,751, 3,724,575, 4,858,475, 4,936,149, and 5,837,946. However, systems in the related art suffer from mechanical complications, inaccurate results caused by off-level condition, fragility, imprecision, and are often difficult to install or retrofit.

Vertical-shear-based systems are typical of the current state of the related art. An example is the Routeman refuse truck fork by Vishay. This system is used since the shear load is not affected by placement of the weight on the fork so long as it is actually on the fork distal to the sensor itself. Such vertical shear forces however are small compared to the primary forces of bending in the cantilever beam, and fragile load cells with means to allow vertical displacement of the cantilever beam are used to create the weigh system. Such vertical-shear-based systems generally lack a weigh system using the strain existing in the functional structure. A bending beam-type system captures the primary structural strain to overcome the complexity and fragility of vertical-shear-based systems.

Bending beam systems are known. For example, U.S. Pat. No. 3,724,575 to Kutsay discloses obtaining a weight in the vertical direction by resolving two load cells with sensors along a horizontal beam. However, such bending beam systems have strain gauges inside an elongated hole within a beam, which weakens the beam. Another problem with such bending beam systems is that the sensors are placed closer to the neutral axis of the beam, and since the magnitude of stress approaches zero close to the neutral axis, stress measurements are thus less accurate. In particular, Kutsay does not teach or fairly suggest providing for off-level compensation or location of the load on the bending beam, and is thus not well suited for use on a vehicle.

A beam form is disclosed in U.S. Pat. App. Pub. No. 20060124365 to Coleman is incorporated by reference herein.

It can be seen, therefore, that there is a need to increase accuracy by measuring larger bending strain, rather than smaller shear strain. It can be seen that there is also a need for greater accuracy in weighing an object by improving accuracy in stress measurement. Also, it can be seen that there is a need to improve accuracy by having a sensing system that tends to avoid the neutral axis of the beam. In addition, it can be seen that there is a need for a robust, lightweight sensing system that is less cumbersome or prone to breakage than conventional shear-based systems. Further, it can be seen that there is a need to determine location of a load relative to the system. In addition, it can be seen that there is a need for a mechanically simpler device which can be easier to install or retrofit onto existing systems. It can also be seen that output difference between tensile and compressive stresses can be used to compensate for off-level condition. Additionally, it can be seen that there is a need to resolve a weight or force without knowing or controlling its location on the weighing apparatus. Furthermore, it can be seen that there is a need to determine load of a mass on a beam which can provide measurements to determine threshold weight, costs, fees, or other business conditions. It can be seen that there is a need to determine location or placement of a load on a cantilever beam so as to alert an operator or manager as to various risks, such as load or vehicle tipping, or if a pallet being moved in a loading dock is too far off-center. Finally, it can be seen that there is a need to address a combination of the above problems.

SUMMARY OF THE INVENTION

To minimize the limitations in the prior art, and to minimize other limitations that will become apparent upon reading and understanding the present specification, the present invention discloses a method and system for determining the location or force of an object on an L-beam.

The description of the preferred embodiments is to be understood as non-limiting examples of the present invention. The true scope of the invention is to be understood by the claims and not limited by the preferred embodiments.

An aspect of the invention is to provide greater accuracy in resolving force or location of load on a L-beam.

An aspect of the invention is to avoid problems associated with complex mechanical parts prone to breakage.

An aspect of the invention is to reduce or eliminate the need for physical sensors on the force-receiving portion of the L-beam.

An aspect of the invention is to enhance safety and detection capabilities in waste disposal concerning, by way of non-limiting illustration: an engine block, a dead body, a broken piece of concrete, or other inappropriate items in the waste stream.

In a possible embodiment, the invention can be retrofitted onto existing vehicles, including onto existing forklift truck forks.

In another possible embodiment, the invention can resolve force, weight, or location of an unknown object based on L-beam geometry and known material properties.

In yet another possible embodiment, the invention weighs an unknown object on a curved hook using its known geometry.

BRIEF DESCRIPTION OF THE DRAWINGS

FIG. 22 is a diagram of a force-sensing method of a possible embodiment of the present invention;

FIG. 23 is a diagram of a location-sensing method of a possible embodiment of the present invention;

DETAILED DESCRIPTION OF THE PREFERRED EMBODIMENTS

Figure 1:
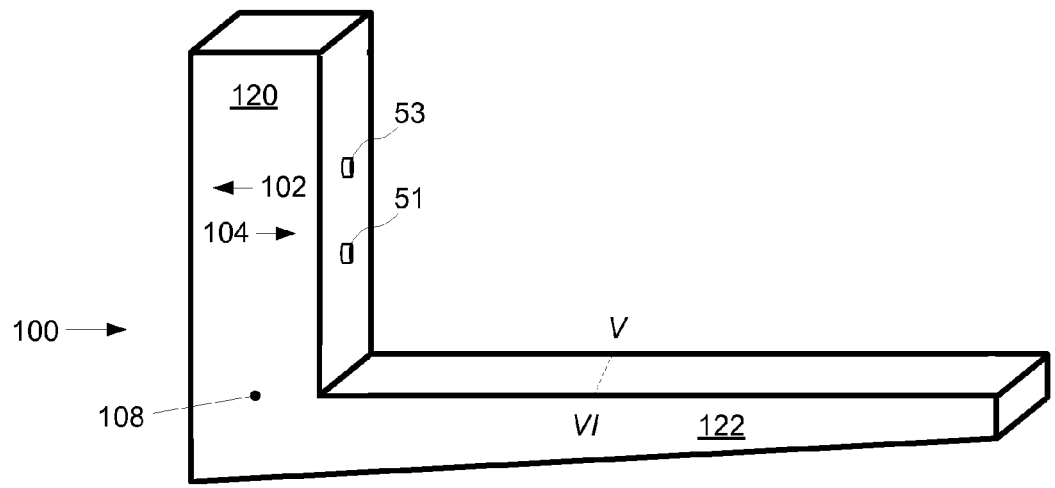
FIG. 1 is an angled side view of a possible embodiment of the present invention.

In the following description of the preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

References throughout the specification to "a possible embodiment," "a preferred embodiment," "some embodiments," "an embodiment," and like reference to "embodiment" are non-limiting examples to aid in understanding the present invention. An "embodiment" provides that there is one or more embodiments that can involve the given element or aspect of the invention. Thus, multiple instances of "an embodiment" and like reference do not necessarily refer to the same embodiment.

This specification provides for specific meanings with respect to the present invention, the meanings of which shall be understood as follows:

"Adjoined" can refer to a state in which two or more things can be, by way of non-limiting illustration: joined, attached, molded, forged, bolted, screwed, attached, affixed, welded, grafted, or any combination thereof.

"Checkout" can refer to purchasing one or more products by identifying such product(s) for payment. Particular products can be identified often by a product ID or equivalent thereof. Checkout is deemed completed when payment is made. In some embodiments of the present invention, checkout can occur when a product is registered at checkout but not yet paid for.

"Downward force" can refer to the direction of gravity, toward the center of the earth.

"Force" (F) can refer to both vector quantities of force and "weight," defined below.

"Lateral" can refer to a position, plane, moment, or movement perpendicular to gravity or the primary direction of the application of force. Lateral can be used in reference to the present invention in determining force or location when correcting for tilt, including but not limited to sensors 1701-1704.

"Lateral force" can refer to a force being measured perpendicular to the primary direction of application such as gravity relative to the surface of the earth. Lateral force can affect, for example, the present invention applied to a mobile vehicle on hilly terrain. Lateral force can be corrected for, to determine downward force F. Lateral force can, for example, be the result of L-beam 100 being in an off-level condition. By way of non-limiting illustration, L-beam 100 can be angled with the extended end upward which can create an off-level condition.

"Moment" (M) can refer to the product of weight (W) times distance (D) from the root. Moment varies as one goes out from a particular area, such as the root. Moment can be a bending effect. Moment can progressively decrease further away from the root due to leverage principles. Moment at a location on the beam, such as the root, can increase as the location of the load is moved distal from the root.

Figure 7:
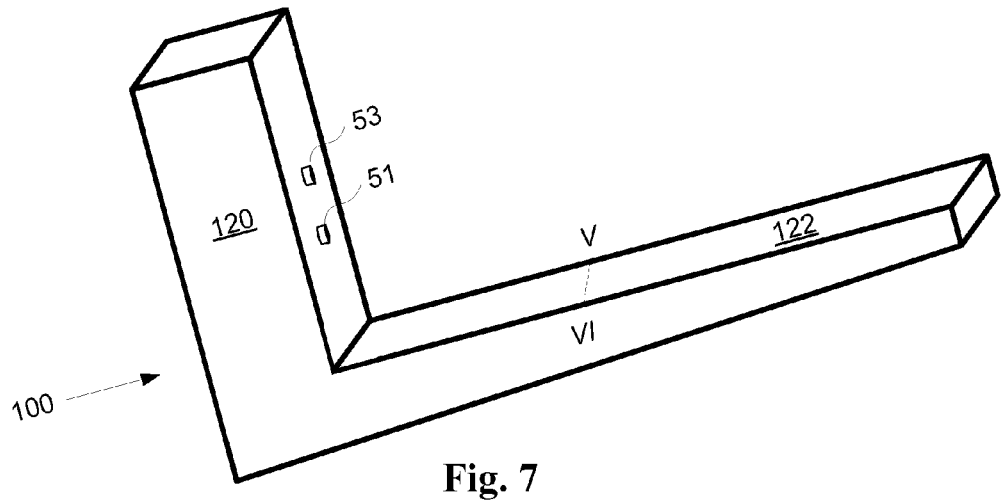
FIG. 7 is an angled side view of a possible embodiment of the present invention to correct for off-level condition.

"Off-level condition" can refer to any state of being non-perpendicular to the direction of gravity. When used in reference to L-beam, off-level condition can be a planar disorientation with respect to the forward or backward dip rotating in the plane of the beam formed by both leg portion and force-receiving portion 122. By way of non-limiting illustration, an off-level condition is shown in FIG. 7.

"Output" when used in reference to sensors, can refer to the output of any given sensor to produce a signal that can be received for processing. A non-limiting illustration can be outputs of sensors 51-54 or lateral sensors 1701-1704, respectively.

"Product" can refer to any item, component, widget, or any physical object, or any group or combination thereof, whether branded or not.

"Side" can refer to a designation not limited to objects having sharp angles. When using "tension side" and "compressive side," such "sides" can refer to opposite rounded portions of a cylindrical shape. Therefore, a "side" is not limited to the six surfaces of a rectangular block. Tension and compression "sides" can thus refer to opposite areas with reference to the respective reference objects being placed upon a given shape having sides.

"Tilt" can refer to any planar disorientation. Tilt can be other than being parallel to the ground. Tilt can be sideways, forward, backward, or any combination such as simultaneous forward and sideways tilt. Further, a non-limiting illustration of tilt can be in relation to a forklift fork truck having L-beam 100 attached thereto, driving on a hill and thus creating a condition of tilt. By way of non-limiting illustration, "tilt" when used in reference to L-beam 100 can refer to a change in the angular relationship such as a "sideways" movement tilting to the side. "Tilt" can also be forward or backward change in angular relationship. For example, a "forward" tilt can be a change in angular relationship where the leg portion 120 of L-beam 100 rotates toward the unsecured end of the force-receiving portion 122 and/or away from the secured end at the adjoining region 108. "Backward" or "rearward" tilt can refer to the opposite of such forward tilt. Tilt can also refer to left or right, relative to the driver's forward orientation such as when driving on an incline or ramp. Another non-limiting illustration of tilt can be lifting a load as the fork assembly is tilted rearward. By way of non-limiting illustration, tilt can be brought about by any of the following: torque, bending moment, first moment of area, second moment of area, polar moment of area, or moment of inertia.

"Vehicle" when used in relation to "tilt," can refer to a movable or mobile object or device to which an L-beam 100 is mounted, or any portion of the mounting structure of L-beam 100, or an intermediate structure relating to the vehicle or mount of L-beam 100, or the vehicle itself, or the surface upon which the vehicle is situated.

"Vertical" can refer to an orientation parallel to the application of force. By way of non-limiting illustration, when the present invention is used as a scale to weigh a product, "vertical" with respect to the present invention can be perpendicular to the surface of the earth.

"Weight" (W) can also be referred to implicitly or expressly as "force." "Weight" as commonly used in commerce to quantify an amount of product, e.g., lbs., tons, etc., can be referred to as a force resulting from an object with mass, subject to gravity. A non-limiting example of such weight can be referred to be unknown force 900.

FIG. 1 is an angled side view of a possible embodiment of the present invention.

Sensors 51 and 53 are shown in FIG. 1, with L-beam 100, compression side 102, tension side 104, leg portion 120, and reference line V-VI.

Sensors 51, 52, 53, and 54 (FIGS. 1 and 2) can each measure local strain at each respective sensor locale. In a preferred embodiment, there can be a plurality of sensors 200, the plurality 200 comprising four sensors 51, 52, 53, and 54, where each sensor 51, 52, 53, and 54 comprises a complete Wheatstone bridge.

In a cantilever beam embodiment, for example, having force receiving portion 122 and no leg portion 120, sensors 51-54 can be mounted to a plate or membrane, there can be two tensile-side sensors and two compressive-side sensors on force receiving portion 122 or, in cantilever beam embodiments, on the cantilever beam. A metering and/or display device 1900 can receive output from the sensors. In an embodiment, display 1900 (FIGS. 19, 20) can be provided with a central processing unit, a memory to receive camera image data, timestamp data, and target acquisition data, and a datastore, preferably local data storage. The datastore can be a local database, flat files, cloud, a third party storage service, in-memory via RAM, any other storage medium, or any combination thereof.

Figure 5:
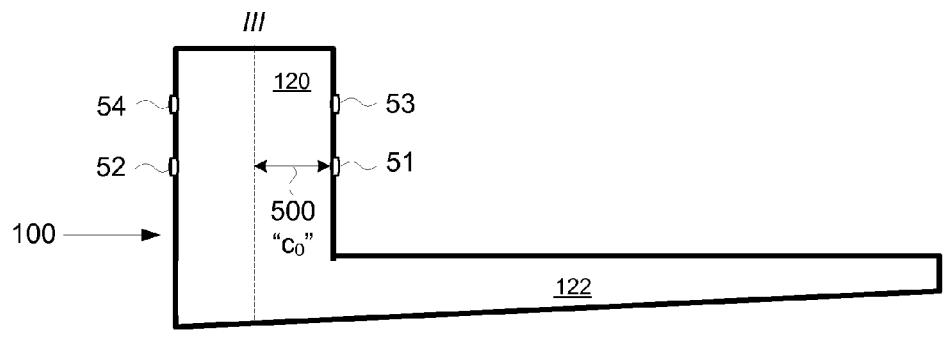
FIG. 5 is a flat side view with reference line III-IV relating to the present invention.

In some preferred embodiments, there can be a pair of sensors 51 and 53 on the tension side of the leg portion 120 of L-beam 100 and another pair of sensors 52 and 54 on the compression side of the leg portion 120 of L-beam 100. A person of ordinary skill in the pertinent art would know how to incorporate sensors 51, 52, 53, and 54. A benefit of having each sensor 51, 52, 53, and 54 as a Wheatstone bridge, rather than a resistor or simple strain gauge, is that a sensor 51-54, each being a Wheatstone bridge, can be incorporated in the present invention to more accurately generate an output in volts scaled to local stress units. Having any one of sensors 51, 52, 53, and 54 as a Wheatstone bridge can allow millivolt units of measure, which can then be scaled 300 (FIG. 3) to be equal to local bending stress in PSI and large delta values. A benefit of using sensors 51, 52, 53, and 54 to measure tensile and compressive strain can be to overcome problems with conventional shear-based measurement devices, which are typically very bulky and fragile. Using shear-based measurement devices can result in smaller measurement increments that are difficult to analyze, being very small. Shear stresses along a beam, though unaffected by the point of application of force, are typically smaller than primary stresses, and can thus generate less signal output than primary stresses. Primary stresses can be compressive and tensile. A benefit of the present invention can be to measure primary stress. Small measurement increments are harder to analyze with high degrees of accuracy; a benefit of larger measurement increments, measurable with sensors 51, 52, 53, and 54, tend to yield larger delta values for each sensor's respective output. In less-preferred embodiments where any sensor 51, 52, 53, and 54 is installed inside a hole, the corresponding output less accurately measures local stress. Local stress can refer to a stress at a respective sensor 51-54. Some preferred embodiments can have sensors 51, 52, 53, and 54 on the surface of the leg portion 120 of L-beam 100, furthest away from the neutral axis III-IV (FIG. 5). Some possible embodiments can have sensors 51, 52, 53, and 54 less than 0.7 mm within the surface of leg portion 120 such that each sensor 51, 52, 53, and 54 is protected while simultaneously providing close-to-surface accuracy in measuring tension-side and compressive-side outputs from each sensor 51, 52, 53, and 54. Thus, output resulting from each surface sensor 51, 52, 53, and 54 can be maximized. In a possible embodiment, a group of resistors can be used instead of a group of Wheatstone bridges. However, this approach is not preferred because local stress units are not obtained in a manner that is relatively easy to measure, since the change in signal is relatively small. A benefit of sensor 51-54 is to enhance ease of measurement of local stress, which can make a significant difference in performing measuring and then calculating weight or location based on local stress. In embodiments where any sensor 51-54 is a strain gauge, a change in resistance for a given sensor 51-54 can be measured. In most preferred embodiments, sensors 51-54 can each be a Wheatstone bridge; thus, each sensor 51-54 can be an arrangement of strain gauges giving a much larger change in signal. In an embodiment, sensors 51-54 can output to a display or system capable of reading the inputs. By way of non-limiting illustration, hardware and/or software can be used to interpret the signals in local stress units given signal changes per any strain via bending on the leg portion 120 of L-beam 100.

L-beam 100 can comprise leg portion 120 and force-receiving portion 122. L-beam 100 can have two or more adjoined portions. In a possible embodiment, there can be adjoining region 108 between leg portion 120 and force-receiving portion 122. L-beam 100 can be any shape having at least one terminating end and at least one curve or angle at adjoining region 108. FIG. 1 shows a non-limiting example of a 90-degree formation of adjoining region of L-beam 100, where it can be understood that leg portion 120 and force-receiving portion 122 are joined. L-beam 100 can have a portion with a beam-like shape, by way of non-limiting illustration, a rod, cylindrical shape, rounded or unrounded, rectangular or non-rectangular, tapered or non-tapered. L-beam 100 can be metal or non-metal, composite, alloy, or otherwise, or any combination thereof. Given that shear-based sensors or load cells are often of a fragile or complicated construction, a benefit of the present invention with L-beam 100 can be to provide a more robust structure while permitting sensing capabilities. In some preferred embodiments, L-beam 100 can comprise a material which follows Hooke's Law. By way of non-limiting illustration, L-beam 100 can have linear elastic properties. L-beam 100 can have a constant Young's Modulus. L-beam 100 can be any material with properties, including but not limited to elasticity E. Elasticity E of L-beam 100 can refer to Young's Modulus known in mechanical engineering.

Further, by way of non-limiting illustration, many steels show a substantially constant Young's Modulus, and can thus be a preferred material for L-beam 100. L-beam 100 can have an elastic range. Lookup tables for material properties can be used to find known or relatively known constants or known elastic ranges for a given material for L-beam 100.

Figure 13:
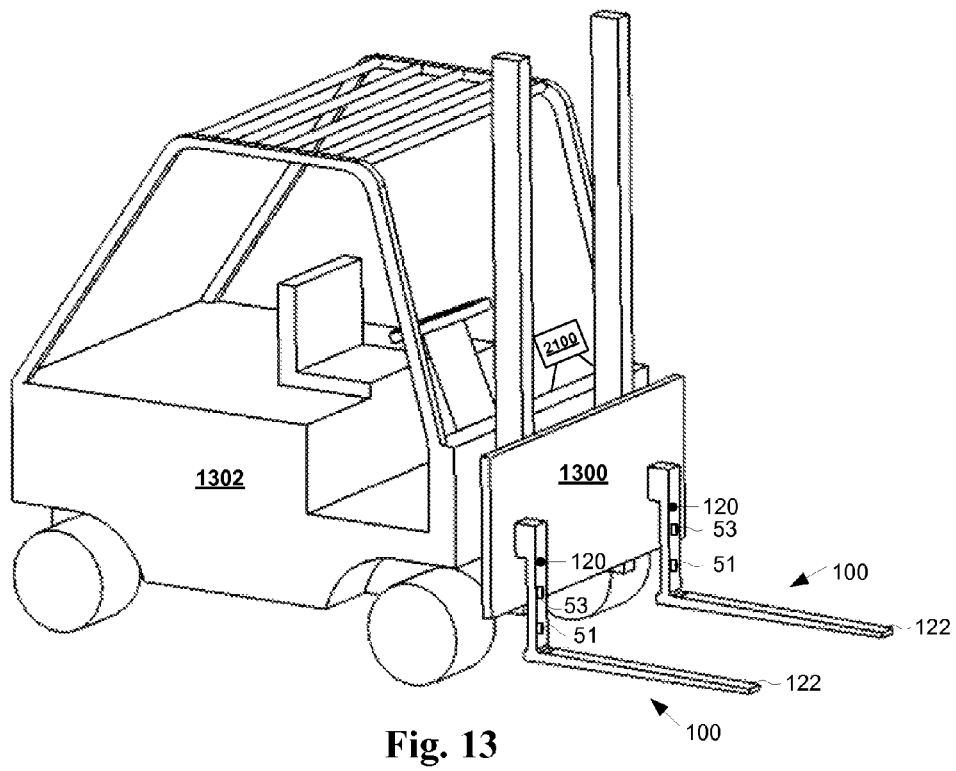
FIG. 13 is a possible vehicle-mounted embodiment of the present invention.
Figure 14:
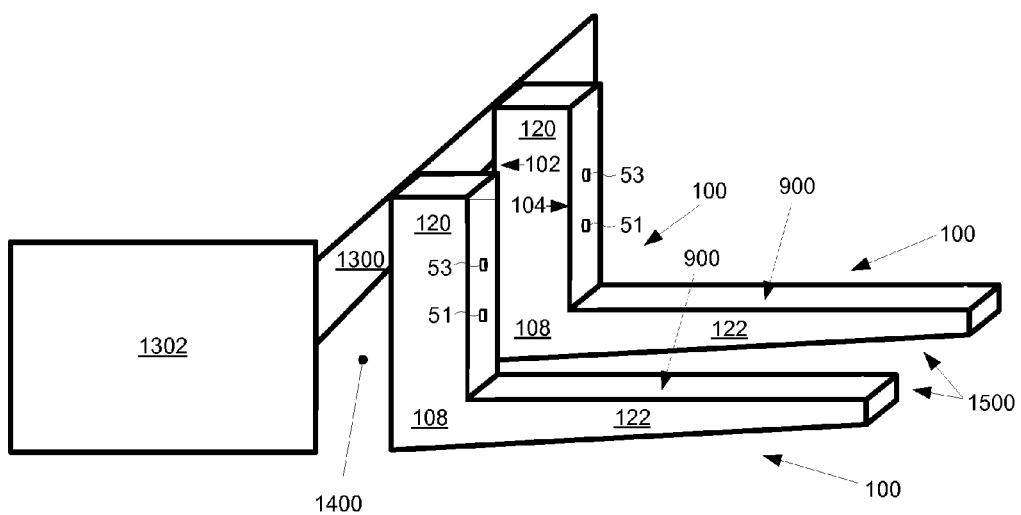
FIG. 14 is a possible dual-L-beam embodiment of the present invention.
Figure 15:
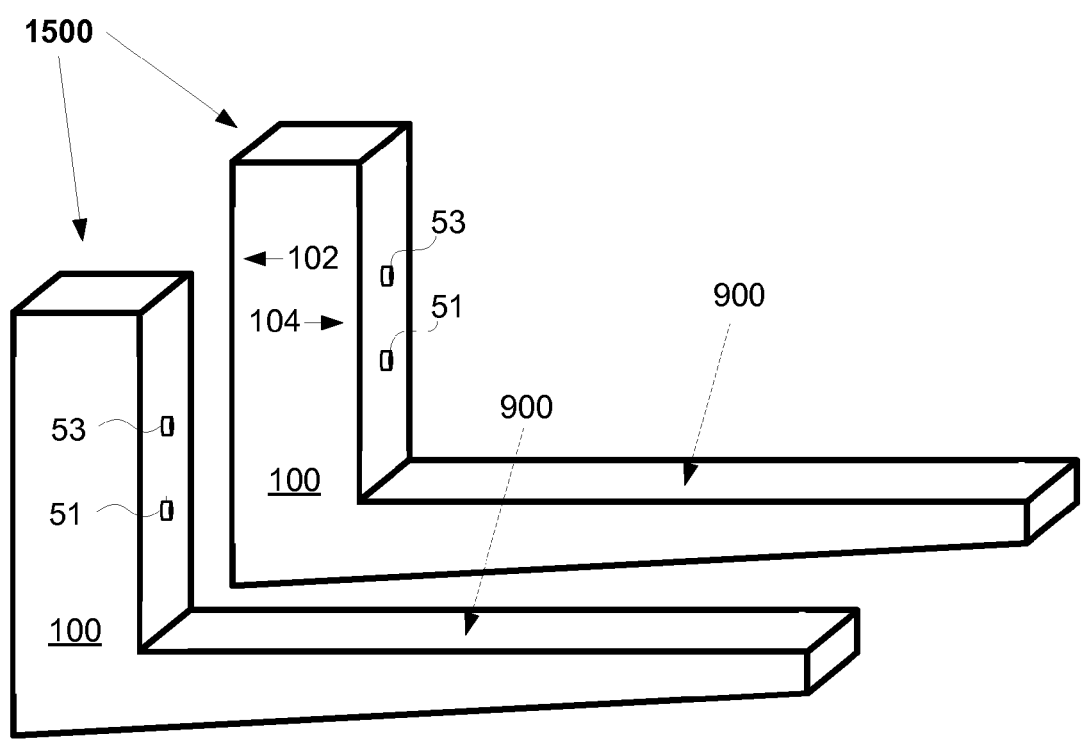
FIG. 15 is a possible dual-L-beam embodiment of the present invention.

In addition, L-beam 100 can be any material known to follow Hooke's law, now known or developed in the future. L-beam 100 can be made to work with non-Hookian materials, though the methods taught in this specification can involve compensation for such non-Hookian materials. The present invention can incorporate non-linear stain gauges, which can also be compensated to use the methods presented. L-beam 100 can have at least one Poisson ratio. A non-limiting example of a Poisson ratio of a rectangular specimen of steel can be about 0.3. In many embodiments, L-beam 100 can be substantially an L-shaped beam, whether formed at a 90-degree angle or not. In some embodiments, there can be more than one L-beam 100 (FIGS. 13, 14, 15). In most preferred embodiments where L-beam 100 is substantially L-shaped, L-beam 100 can comprise two beams roughly forming a 90-degree angle. L-beam 100 need not be parallel to the ground. L-beam 100 can have a wide range of possible shapes, whether curved, two straight beams joined at a 90° angle or any other angle other than 180°, irregular, or otherwise. L-beam 100 can include any structure having (i) known geometry, and therefore subject to mathematical analysis based on one or more sensors, and (ii) known material properties preferably to which Hooke's Law can be applied. L-beam 100 can, in most preferred embodiments, have an L-shape. By way of non-limiting illustration, L-beam 100 can have the shape of a curve, a hook, a curved scimitar shape, or any shape where the leg portion 120 extends at a different angle than force-receiving portion 122. In some possible embodiments, L-beam 100 can be inverted, may support a platform, or incorporate a platform, shelf, roof, beam, or any other physical structure, fixed or unfixed. L-beam 100 can be incorporated into a wide range of applications, such as, by way of non-limiting illustration, refuse garbage truck forks, forklift truck forks, lifts, stairs, escalators, elevators, shelves, storage containers, transports, platforms, cargo loading equipment, cranes, mechanical arms, static or non-static, or otherwise. A benefit of L-beam 100 can be to accommodate for tilt of off-level conditions.

Figure 2:
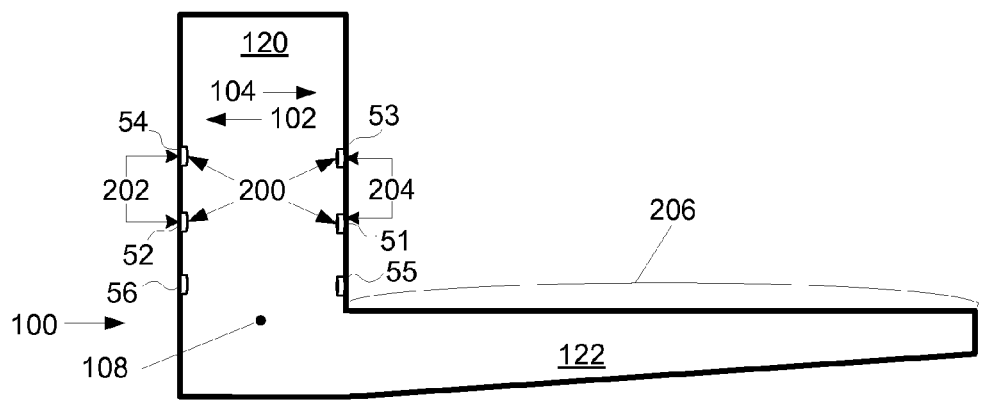
FIG. 2 is a flat side view of a possible embodiment of the present invention.

Compression side 102 can be on leg portion 120. In most preferred embodiments, compression side 102 can have sensors 52 and 54 (FIG. 2).

Tension side 104 can be on leg portion 120. Tension side 104 can be substantially opposite compression side 102. In most preferred embodiments, tension side 104 can have sensors 51 and 53 (FIG. 2).

Adjoining region 108 can be on leg portion 120, close to the junction of the leg portion 120 and force-receiving portion 122. By way of non-limiting illustration, placing sensors 51, 52, 53, and 54 near adjoining region 108 such as 55 and 56 are, will not have accurate sensor readings. In simulation via finite element analysis, the actual results of sensors 55 and 56 were observed to stray significantly from the expected results (see Tables 1.1 and 1.2). Thus, placing sensors 51, 52, 53, and 54 near adjoining region 108 are not preferred.

Leg portion 120 can be a solid portion with relative rigid or elastic properties, preferably being of a material that follows Hooke's Law. In most preferred embodiments, leg portion 120 typically does not directly receive the brunt of unknown force 900, in contrast to force-receiving portion 122. In less preferred embodiments, some force can be received on leg portion 120. In many embodiments, leg portion 120 can be substantially vertical. Leg portion 120 need not be a rectangular volume. Leg portion 120 can be substantially vertically positioned in most preferred embodiments. Leg portion 120 can also support weight concurrently with force-receiving portion 122. Protective measures can be taken to protect sensors 51, 52, 53, and 54 on leg portion 120. Leg portion 120 can allow the configuration of the present invention to determine weight or location perpendicular to the direction of the application of the load. Since sensors 51, 52, 53, and 54 can be on leg portion 120, sensors 51, 52, 53, and 54 can be mounted on the tensile and compression sides of leg portion 120. In some possible embodiments, where L-beam 100 is curved, leg portion 120 can be any portion other than that which is perpendicular to the direction of force. Thus, in such embodiments, any of sensors 51, 52, 53, and 54 on leg portion 120 can have more placement variation. In some possible but less preferred embodiments, the orientation of leg portion 120 can be horizontal, with force-receiving portion 122 being vertical. In a preferred embodiment, leg portion 120 can be parallel to the vector of unknown force 900 in when unknown force 900 is at least partly perpendicular to force-receiving portion 122. A benefit of leg portion 120 can be to separate force and stress determinations by providing separation from the location where force is applied; this can be seen as a way to better protect sensors 51-54 in some possible embodiments.

Figure 4:
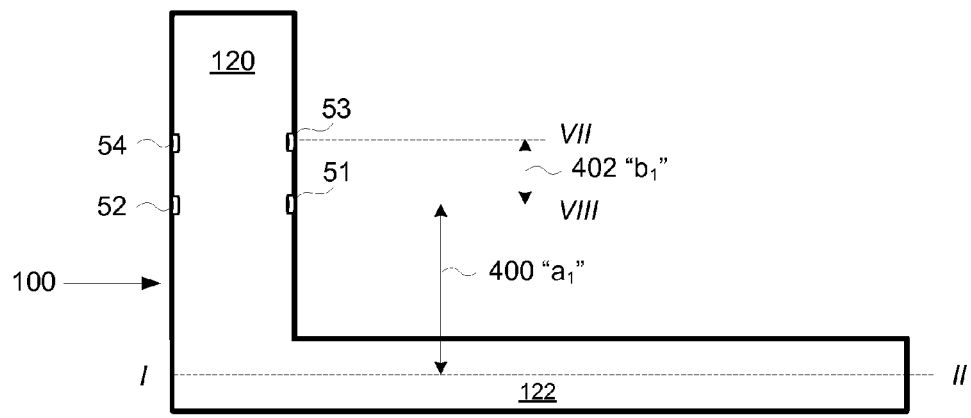
FIG. 4 is a flat side view with reference line I-II of the present invention.

Force-receiving portion 122 can be an extending portion of L-beam 100 other than leg portion 120. Force-receiving portion 122 can join leg portion 120 at adjoining region 108. In many embodiments, force-receiving portion 120 can be perpendicular to the direction of the application of force, such as unknown force 900 (FIGS. 9, 10, 11, and 12). In most preferred embodiments, unknown location 800 can be on force-receiving portion 122. Force-receiving portion 122 can have neutral axis I-II (FIG. 4). The present invention and reference neutral axis I-II can be adapted to L-beams 100 having widely varied shape. In most embodiments, force-receiving portion 122 can be a beam-like shape. Force-receiving portion 122 can have an absence of sensors 206 (FIG. 2). A benefit of force-receiving portion 122 can be to receive force without sensors to encumber force-receiving portion 122. In some possible embodiments, force-receiving portion 122 can provide maximized space to receive a load, protect sensors 51-54 and lateral sensors 1701-1704 (FIGS. 16, 17, and 18), and prevent sensors from being pushed or scraped off by a heavy load which may slide on force-receiving portion 122. Force-receiving portion 122 can be capable of receiving an unknown force 900. Force-receiving portion 122 can be capable of receiving unknown location 800, or capable of receiving unknown force 900 having unknown location 800. A benefit of receiving unknown force 900 or unknown location 800 can be to later determine a respective characteristic of unknown force 900 or unknown location 800 consistent with the present invention, and any attribute relating thereto, including but not limited to weight, height, size, price, cost, quantity, or other characteristics given other known constraints or known values. A non-limiting illustration of determining price and quantity can be where force-receiving portion 122 is a tray or receives force upon a tray capable of holding unknown force 900, the unknown force 900 being applied by medication, and then determining unknown force 2200 of a given medication. Then, such information can be associated with a possible range of medications, which can include by way of non-limiting illustration: price, manufacturer, recent prescription, proper distribution count or ideal distribution weight, quantity of pills in a medication container or any combination thereof. Unknown force 900 can be the weight of medication placed on, connected to, upon, or otherwise causing to receive stress or strain upon force-receiving portion 122 thereby affecting leg portion 120 and sensors 51-54 thereupon. Force-receiving portion 122 can be a cantilever beam attached to a secured end without leg portion 120. In a possible embodiment, force-receiving portion 122 without leg portion 120 can be tapered, curved, or crooked. In a possible embodiment, force-receiving portion 122 can be a cantilever beam, including as specified herein and in U.S. patent application Ser. No. 11/010,161 to Coleman filed on Dec. 13, 2004.

FIG. 2 is a flat side view of a possible embodiment of the present invention.

Plurality of sensors 200 are shown in FIG. 2, with pair of compression-side sensors 202, pair of tension-side sensors 204, absence of sensors 206, L-beam 100, compression side 102, tension side 104, and sensors 51, 52, 53, 54, 55, and 56. Sensors 51 and 53 are shown on tension side 104; and sensors 52 and 54 are shown on compression side 102.

Plurality of sensors 200 can be two or more sensors. In most preferred embodiments, plurality of sensors 200 can have at least four localized sensors 51, 52, 53, and 54.

Pair of compression-side sensors 202 can be placed other than on force-receiving portion 122. Pair of compression-side sensors 202 can be provided on compression side 102 of leg portion 120, such as sensors 52 and 54.

Pair of tension-side sensors 204 can be placed other than on force-receiving portion 122. Pair of tension-side sensors 204 can be provided on tension side 104 of leg portion 120, such as sensors 52 and 54.

Absence of sensors 206 can be on L-beam 100, for example, other than the positions of sensors 51-54. In most preferred embodiments, absence of sensors 206 can be on force-receiving portion 122. A benefit of absence of sensors 206 can be to avoid force-receiving portion 122. In most preferred embodiments, sensors 51-54 can be present on leg portion 120.

Figure 3:
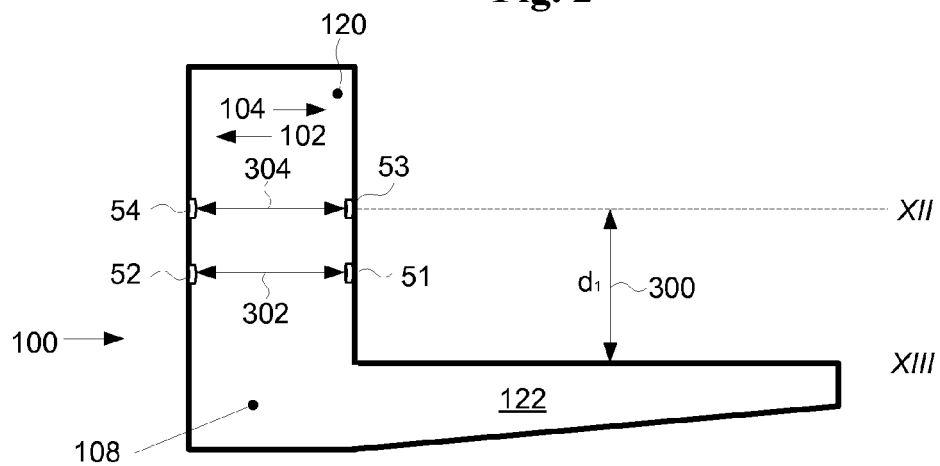
FIG. 3 is a flat side view of a possible embodiment of the present invention.

FIG. 3 is a flat side view of a possible embodiment of the present invention.

Distance 300 is shown in FIG. 3 with distance 302.

Distance 300 "$d_1$" can be a known distance between sensor 53 (FIG. 3, reference line XII) and force-receiving portion 122 (FIG. 3, reference line XIII) of L-beam 100. By way of non-limiting illustration, distance 300 can be a known length shown by reference lines XII and XIII of FIG. 3. Distance 300 can be a known distance from a sensor (XII) to the surface of force-receiving portion 122 (XIII). Distance 300 can be substantially along a plane of leg portion 120 in embodiments where leg portion 120 is straight.

Distance 302 "$h_1$" can be a known distance on leg portion 120. Distance 302 can be a distance between compression side 102 and tension side 104. Distance 302 can be a distance between opposing sensors, for example, a distance between sensors 51 and 52, or between 53 and 54, or a distance between a first midpoint between sensors 51 and 53 to a second midpoint between sensors 52 and 54.

Most preferred embodiments can have four sensors, for example, sensors 51, 52, 53, and 54. In a preferred embodiment, there can be four Wheatstone bridge-type sensors 51, 52, 53, and 54, where each sensor 51, 52, 53, and 54 is capable of measuring four distinct strain areas, respectively. Further, some possible embodiments can have three sensors, for example, any three of sensors 51, 52, 53, and 54. The neutral axis of the substantially vertical portion of the L-beam 100 can be found. A first local sensor can be placed in the neutral axis. However, this embodiment is not superior because the off-level compensation cannot be invoked using the method provided herein. Further, the sensor positioned on the neutral axis does not provide significant readings, because the compressive and tensile forces are much smaller as the neutral axis is approached and thus cannot be measured as accurately, compared to four-sensor L-beam embodiments, which are preferred over three-sensor embodiments. Although a two-sensor version comprising one tension side and one compression side sensor can resolve a weight, the two sensors is not preferred since one of the dimensions cannot be easily interpreted. In a possible three-sensor embodiment, a front sensor and a back sensor can cancel each other out to get the downward force. An upper and a lower sensor can make off-angle correction where the third sensor is either the upper or lower sensor with a known vertical distance. One or more of sensors 1701-1704 (FIGS. 16-18) can be placed on a neutral axis of leg portion 120 (line III-IV of FIG. 5), on leg portion 120. In a preferred embodiment, sensors 1701-1704 can be on a side of leg portion 120. In some preferred embodiments, sensors 1701-1704 can be on lateral sides of leg portion 120. In a preferred embodiment, sensors 1701-1704 can be paired in opposing positions on leg portion 120. A benefit of one or more of sensors 1701-1704 can be to detect and/or compensate for a lateral off-level condition. Detecting change in sensor output via one or more sensors 51-54 can be used to compensate for forward and/or rearward tilt. Generally, two-sensor embodiments are not preferred since off-level conditions would not be easily detectible or correctable, lacking a third measurable dimension.

One benefit of sensors 51, 52, 53, and 54, over traditional vertical-shear-based sensor systems is that the load on force-receiving portion 122 can be accurately measured, for example, without significant downward displacement of L-beam 100 or a mechanism to accommodate capture of shear forces of L-beam 100. Strain can be measured on compression and tension sides 102 and 104. There is a change in strain from a point toward the edge of the beam, compared to a point near the center of the beam.

After experimenting with bending-based measurement devices instead of shear-based systems, it was found that bending-based measurement approach is superior because this approach measures local stress and can obtain larger measurement values, and thus greater accuracy. In most preferred embodiments, strain gauges can be configured into a Wheatstone bridge.

In a possible embodiment, each sensor 51, 52, 53, and 54 can have an input of 10 volts (V) and an output of 0-100 millivolts (mV). In embodiments where sensors 51-54 are each Wheatstone bridges, there can be a theoretical output of up to 10 mV per V of input per each sensor 51-54 at maximum strain. In practice, it was found that only 3 mV/V of output can be typical in actual practice. In semiconductor strain gauges, gain can be much higher, but non-linear.

Figure 6:
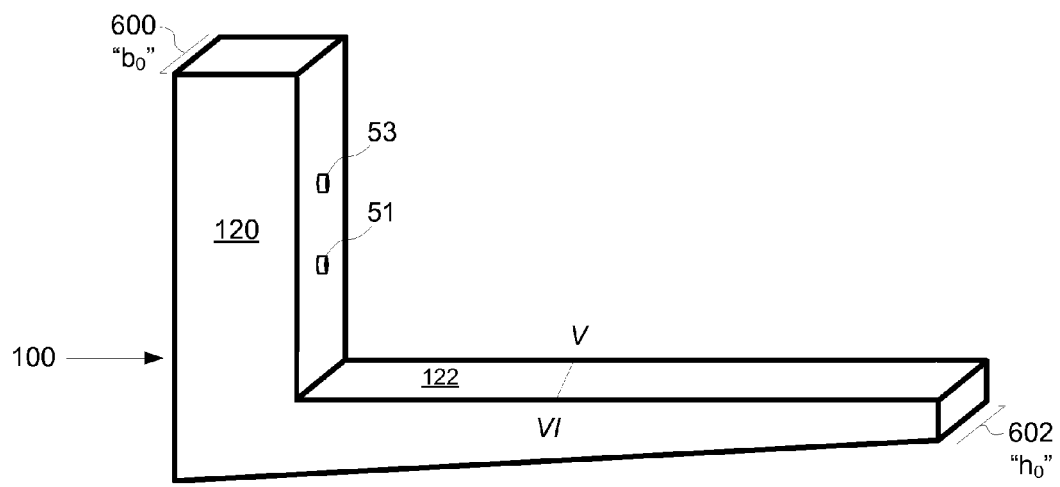
FIG. 6 is an angled side view with reference line V-VI relating to the present invention.

FIGS. 4, 5, and 6 show y-axis (I-II), z-axis (III-IV), and x-axis (V-VI). The present invention can compensate for forces directed at various angles, an explanation of which can be appreciated by use of three-dimensional axes. Force (F) can be applied to force-receiving portion 122 where F is an unknown.

FIG. 4 shows reference line I-II relating to the present invention.

Sensors 51, 52, 53, and 54 are shown in FIG. 4, with L-beam 100, leg portion 120, force-receiving portion 122, and reference line I-II.

"y" can refer to a y-axis, parallel to reference line I-II shown in (FIG. 4).

$F_y$ can be the force in the "y" direction where "y" represents the direction along the force-receiving portion 122.

Distance "$a_1$" 400 can be a distance perpendicular to and extending from the neutral axis (reference line I-II in FIG. 4) of force-receiving portion 122 to sensor 51.

Variable "$b_1$" 402 can be a distance between two sensors along leg portion 120. In situations where leg portion 120 is perfectly vertical, "b" can refer to the vertical distance between two tensile-side sensors 51, 52, 53, and 54 or between two compression-side sensors 51, 52, 53, and 54. In most preferred embodiments, the distance between sensors 51 and 53 substantially equals the distance between sensors 52 and 54.

FIG. 5 shows reference line III-IV relating to the present invention.

Distance 500 is shown in FIG. 5, with sensors 51, 52, 53, and 54, L-beam 100, leg portion 120, force-receiving portion 122, and reference line III-IV.

"z" can refer to a z-axis, shown by (FIG. 5) and parallel to reference line III-IV.

$F_z$ can be the force in the "z" direction where "z" represents direction of gravity with respect to the earth and is normally perpendicular the axis of force-receiving portion 122 in most preferred embodiments. Calculated $F_z$ is shown in column K, Table 1.2.

Distance 500 can be the distance from sensor 51 to the neutral axis (III-IV) of leg portion 120.

FIG. 6 shows reference line V-VI relating to the present invention.

Sensors 51 and 53 are shown in FIG. 6, with L-beam 100, leg portion 120, force-receiving portion 122, and reference line V-VI.

"x" can refer to an x-axis, shown by reference line IV-V (FIGS. 1 and 6).

F can be a force at an off-angle orientation not parallel to "z" (not parallel to reference line IV-III).

Unknown force 900 (FIG. 9) can be sought to be resolved. By way of non-limiting illustration, L-beam 100 can be being 2 inches thick and 4 inches wide.

$a_1$=distance 400 (FIG. 4), which can be a distance between sensor 51 and the neutral axis (I-II) of force-receiving portion of L-beam 100.

$b_1$=distance 402 between sensors 51 and 53 (FIG. 4).

$c_0$=distance 500 (FIG. 5).

$b_0$=distance 600 (FIG. 6).

$h_2$=distance 603 (FIG. 6).

$h_0$=distance 602 (FIG. 6). Distance 602 can be the thickness of force-receiving portion 120 planar to a plane which includes line V-VI (FIG. 6). There can be a moment "m" when unknown force 900 is applied to force receiving portion 122 of L-beam 100.

Generally, in a non-limiting L-beam example, unknown force 900 in the "z" direction can be found by the following (FIG. 23).

δ 2300 can represent a change in sensor value. For example, δ53 can represent a change in sensor 53, measured by the difference in stress measured at sensor 53 before and after unknown force 900 is applied. Similarly, δ 51 can represent a second change stress detected by sensor 51. A benefit of θ 2300 can be to allow any of sensors 51-54 to provide input for subsequently determining unknown force 900 or unknown location 800. δ 2300 can be an output in millivolts in embodiments where sensors 51-54 are Wheatstone bridges. Sensors 51-54 can be "zeroed" or balanced out with trim resistors in the no-load condition. δ 51-54 can be the output of sensors 51-54, conditioned and scaled to read in units of local stress such as PSI.

The sum of outputs of sensors can be scaled to units of local stress. For example, 51+52=K(F/A), where variable A can be a cross sectional area of leg portion 120 through a plane perpendicular to the page and comprising distance 302 (FIG. 3) and F=unknown force 900. K can be an appropriate constant chosen to convert an at least one millivolt output of sensor 51-54 (or 1701-1704 in cases of lateral tilt) to equal the local stress in appropriate units such as PSI.

Further, the sum of outputs of sensors 53+54=2(F/A), where A is a cross-section of leg portion 120 shown by distance 304 (FIG. 3) and F=unknown force 900.

By way of non-limiting illustration, specific values can be known:

$d_1$=4.5"

Figure 27:
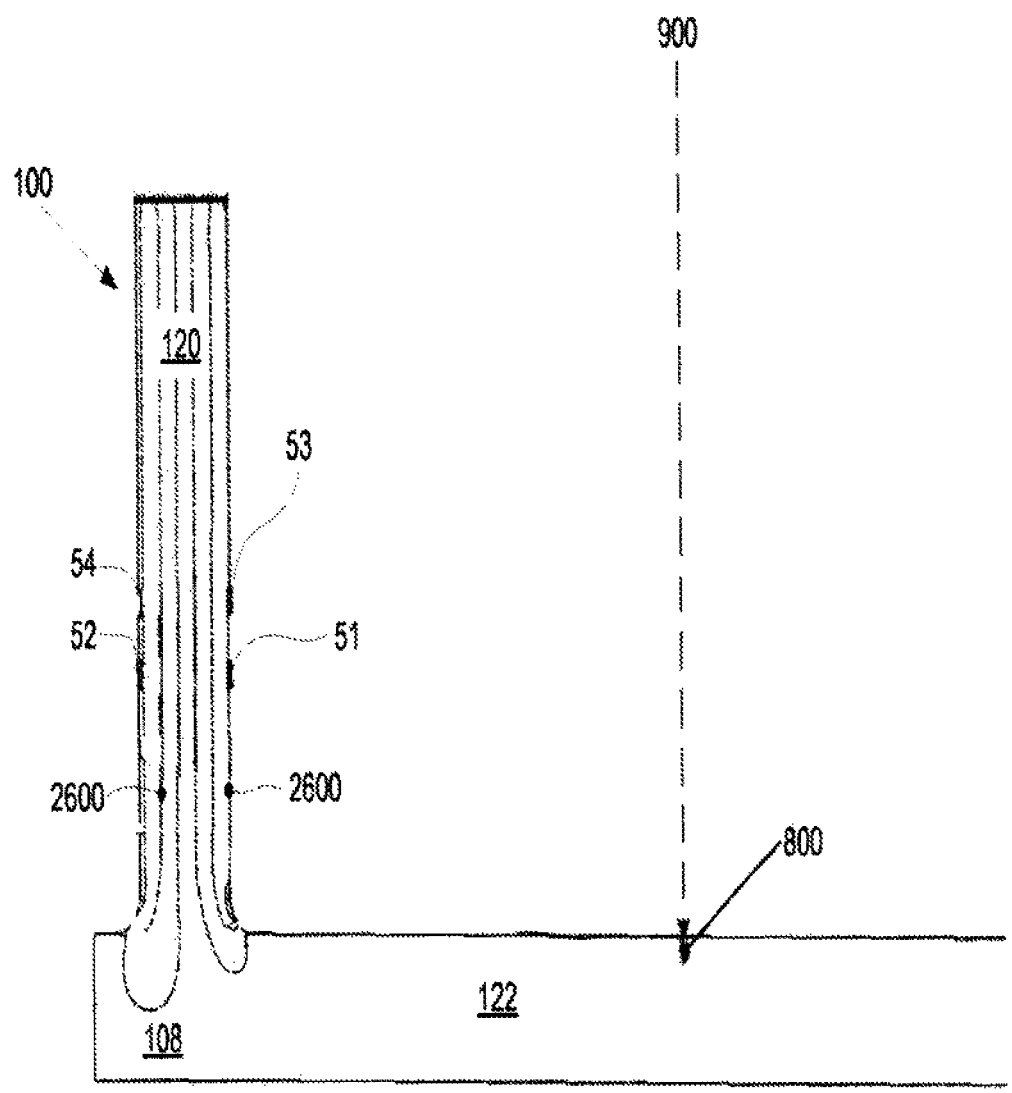
FIG. 27 shows a finite elements analysis of a possible embodiment of the present invention with data labels.

$b_0$=4"=width of the beam $b_1$=1"="vertical" distance between the sensors. $b_1$ can also be seen as used in a finite elements analysis, as shown in FIG. 27 as the distance between 53 (node 20502) and 51 (node 20092 and also as the distance between 54 (node 20482) and 52 (node 20072)

$c_0$=1"

$h_0$=4"=width of the force receiving portion 122 of L-beam 100

$F_y$ can be a force vector in the Y direction. By way of non-limiting illustration, $F_y$ can be a transverse force in force-receiving portion 122. $F_y$ can result from a force being applied, initially perpendicular to leg portion 120 in most preferred embodiments where leg portion 120 is perpendicular to force-receiving portion 122. In a possible embodiment, force-receiving portion 122 can be non-level with the ground, while a weight ($F_y$) is applied.

$$\delta_{53}=((F_y*d_1)*C_0)/((1/12)*b_0*h_2^3)$$

$$\delta_{51}=((F_y(d_1-b_1))/((1/12)*b_0*h_2^3)$$

Since $b_0$, $h_2$, $d_1$, $b_1$, $C_0$ and K are constants in preferred embodiments, Fy can be resolved and expressed as:

$$Fy=Jy*(\delta_{53}-\delta_{51})$$

By way of non-limiting illustration, in a possible embodiment where L-beam comprises a 2"-thick and 4"-wide L-beam, $J_y$ can be approximated as 2.6666 in². In experimentation, an FEA simulation described in Tables 1.1, 1.2, and 2 reflects a non-limiting 2×4 possible embodiment of the present invention. It can be seen that $J_y$ values can be approximated with different numbers.

Fz=Force vector in the direction of the substantially vertical portion the beam 120. It can be obtained by $(\delta_{53}+\delta_{54})*(b_0*h_2)$. When the force is applied parallel to 120 (perpendicular to force-receiving portion 122 in the case where this is a 90 degree L-beam), i.e., the L-beam is level as a weight is placed, this is the "weight." In the event of a weight placed on the L-beam in an off-level condition, this can be corrected as shown below.

$$F=\text{force or weight applied}=(F_z^2+F_y^2)^{0.5}$$

For the above non-limiting example of a 2"×4" L-beam 100, $F_y$ reduces to:

$$F_y=(\delta_{53}-\delta_{51})*2.666 \text{ in}^2 \text{ repeating.}$$

Thus, it can be understood that the sensors of the present invention in a L-beam 100 geometry using a known material can help ascertain an unknown force 900. Each reading for sensors 51, 52, 53, and 54 and 1701, 1702, 1703, and 1704 can be obtained by a Wheatstone bridge which when conditioned as described herein, can output a figure equal to or converted to equal local stress due to forces acting upon the L-beam. In most preferred embodiments, sensors 51-54 and 1701-1704 can be measured in millivolts and scaled to pounds per square inch (PSI) using an appropriate "K". There can be an output for each sensor 51, 52, 53, and 54 and 1701, 1702, 1703, and 1704.

To enhance accuracy, sensors 51, 52, 53, and 54 can be spaced further apart on leg portion 120.

FIG. 7 is an angled side view of a possible embodiment of the present invention to correct for off-level condition. L-beam 100 is shown in FIG. 7 with reference line IV-V shows a plane in reference to force-receiving portion of L-beam 100.

Figure 8:
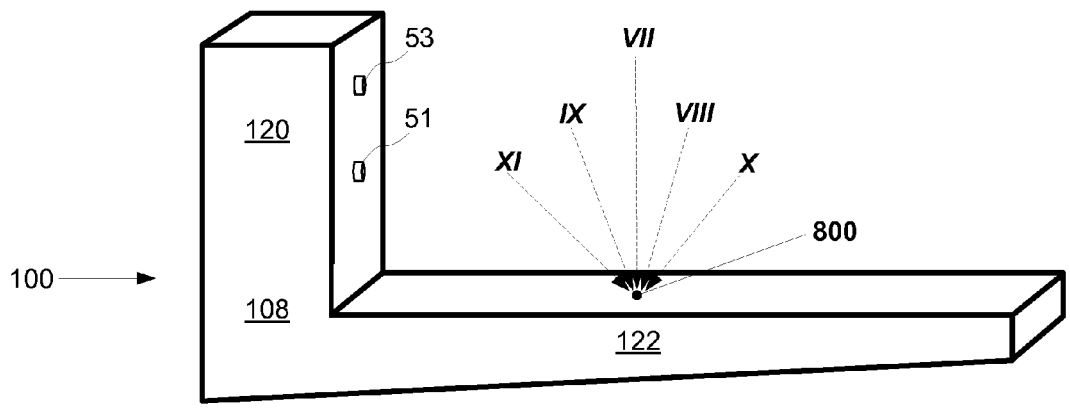
FIG. 8 is a side view of five separate load cases superimposed on the same point but at different angles, to demonstrate correction using the present invention.

FIG. 8 shows five separate load cases (VII, VIII, IX, X, and XI) superimposed on the same unknown location 800 but at different angles, to demonstrate off-angle correction using the present invention.

Unknown location 800 is shown in FIG. 8, with unknown forces VII, VIII, IX, X, and XI, L-beam 100, sensors 51 and 53, adjoining region 108, leg portion 120, force-receiving portion 122.

In many embodiments, loading can be non-perpendicular to a horizontal axis. By way of non-limiting illustration, the present invention can be a vehicle-mounted scale acquiring a load on a hill, reflected in FIGS. 9, 10, 11, and 12 which also correspond to non-limiting examples in the FEA of Tables 1.1, 1.2, and 2.

Unknown force 900 (F) (FIG. 9) can be sought to be resolved. Resolving unknown force 900 can help determine the weight at unknown location 800.

The outputs of sensors $\delta$ 51, $\delta$ 52, $\delta$ 53, and $\delta$ 54 can be known since readings can be obtained. Sensors 51, 52, 53, and 54 can provide the following:

The sum $S_0$ can be found by the sum of opposing sensors (tension sensors 51 and 53 versus compression sensors 52 and 54), being tensile and compressive sensors in the lowest position of leg portion 120 which are not near adjoining region 108. See Tables 1.1 and 1.2.

Theta "$\Theta$" can be unknown. Theta can be the angle whereby leg portion 120 of the L-beam is positioned at relative to the earth. Theta can be any angle other than a 180-degree or 0-degree angle. Theta is typically 90 degrees. In some possible embodiments, off-level condition can be due to the installation or mounting of the device, rather than tilt associated with a vehicle to which L-beam 100 is mounted. In some possible embodiments, L-beam 100 can be mounted on a vehicle that is on an off-level surface, such as on a hill, crowned road, loading dock ramp, etc. L-beam 100 can be used as forks of a fork-lift truck being inclined to pickup an object, not limited to a load, pallet, or garbage can.

$$\delta_{52}+\delta_{51}=F_z/A=F/A(\sin\Theta)$$

$$\delta_{53}+\delta_{54}=F_z/A=F/A(\sin\Theta)$$

$$\delta_{55}+\delta_{56}=F_z/A=F/A(\sin\Theta)$$

can also apply in some possible embodiments.

In this case, the component $F_y$ can be resolved by adding the opposing values of sensors, with the difference in output $D_0$ between upper and lower sensors. Coleman USPA Ser. No. 20060124365 and Kutsay U.S. Pat. No. 3,724,575 teach examples of resolving by opposing values.

By way of non-limiting illustration, distance 500 "$c_0$" can be a distance from sensor 53 to the neutral axis of leg portion 120 (FIG. 5, line III-IV). In some possible embodiments, distance 500 can be the distance from any of sensors 51-54 to line III-IV. In most preferred embodiments, sensors 51-54 are substantially equidistant from the neutral axis III-IV of leg portion 120.

An unexpected result observed that sensors 55 and 56 (FIG. 2) in the FEA were inaccurate. It was observed that sensors 55 and 56 were too close to adjoining region 108. Thus, placement of sensors away from adjoining region 108 also unexpectedly provides a benefit of greater accuracy by placement of sensors 51-54. See FIG. 26 (the stress lines of the plot were not parallel to the edges of leg portion 120 at adjoining region 108, which is near the positions of sensors 55 and 56).

Figure 9:
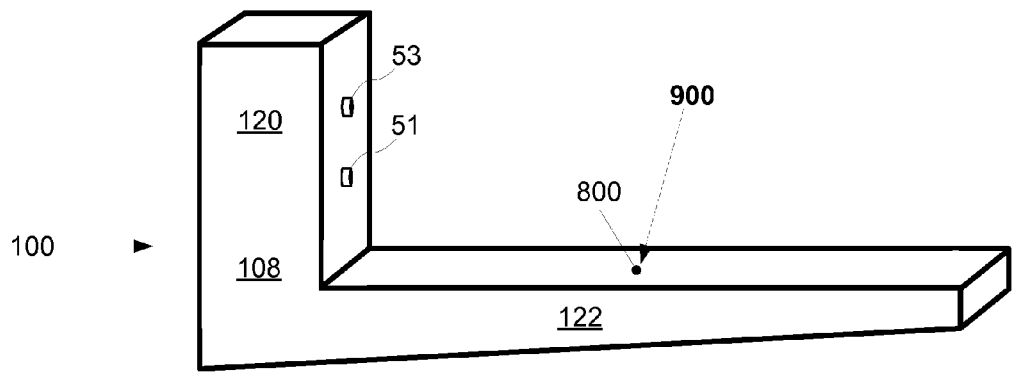
FIG. 9 is a first off-angle load case of the present invention.

FIG. 9 is a first off-angle load case of the present invention.

Unknown force 900 is shown in FIG. 9, with L-beam 100, sensors 51 and 53, adjoining region 108, leg portion 120, force-receiving portion 122. Sensors 52 and 54 are parenthetically indicated for reference.

Unknown force 900 can be a force non-perpendicular to force-receiving portion 122.

Force-receiving portion 122 can be tilted to be non-perpendicular to the localized surface of the earth.

Figure 10:
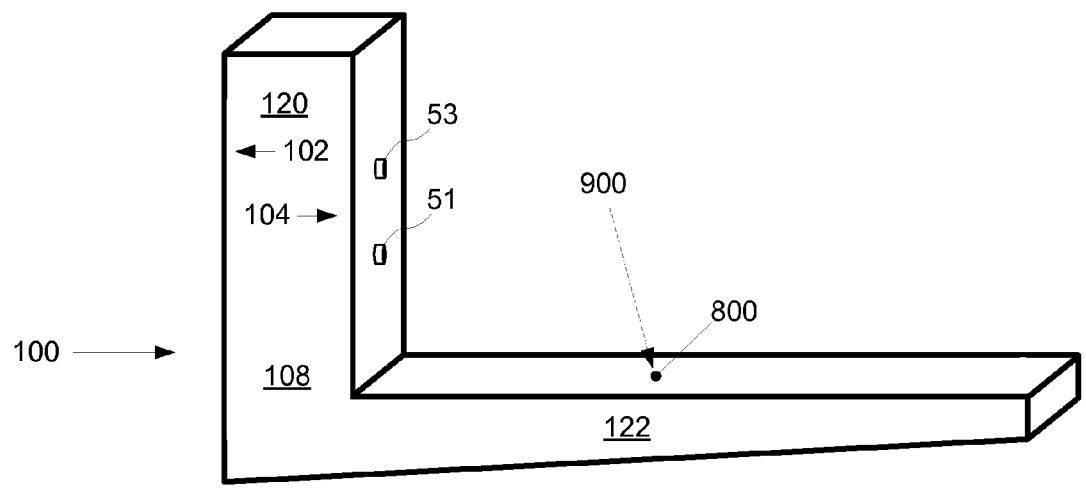
FIG. 10 is a second off-angle load case of the present invention.
Figure 11:
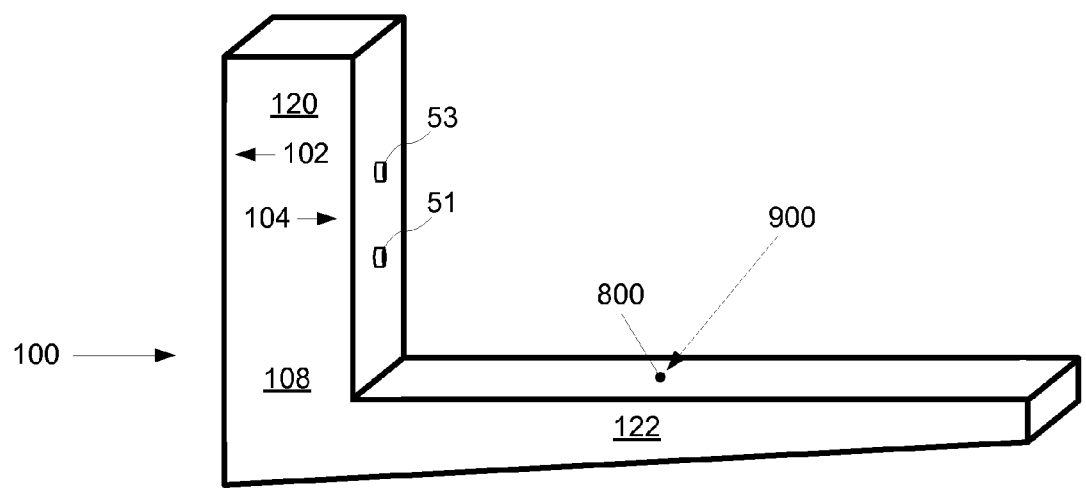
FIG. 11 is a third off-angle load case of the present invention.
Figure 12:
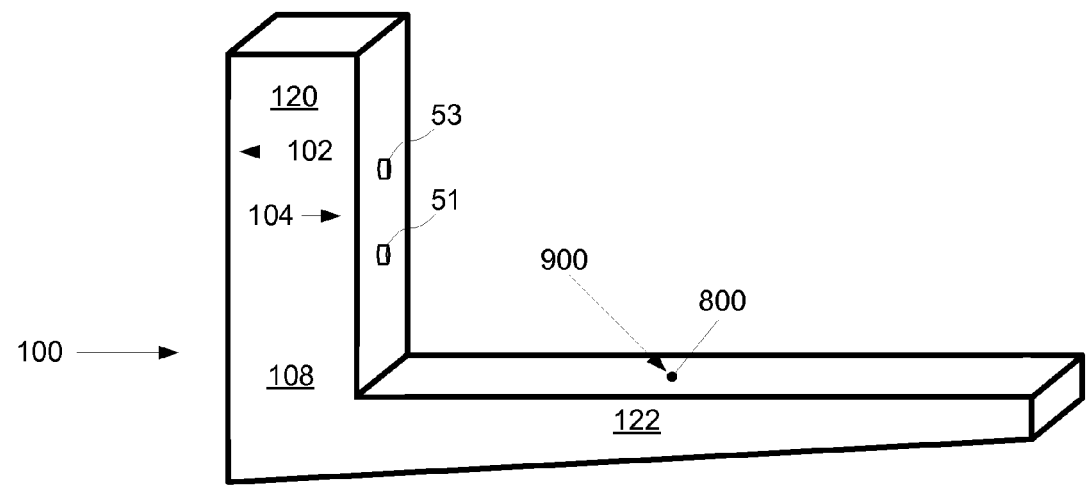
FIG. 12 is a fourth off-angle load case of the present invention.

FIGS. 10-12 show second, third, and fourth off-angle load cases of the present invention, respectively.

FIG. 13 is a possible vehicle-mounted embodiment of the present invention.

Mounting surface 1300 is shown in FIG. 14 with vehicle 1302, sensors 51 and 53, L-beam 100, and display 1900. Sensors 52 and 54 can be present but are obscured from this particular view.

Mounting surface 1300 can be any material to which L-beam 100 is substantially attached. Mounting surface 1300 can be attached to or attachable to vehicle 1302. In some possible embodiments, mounting surface 1300 can be formed as part of L-beam 100 itself.

Vehicle 1302 can be any transportation device, whether wheeled or non-wheeled. By way of non-limiting illustration, vehicle 1302 can be a forklift, refuse truck, cargo lift, crane, construction vehicle, aircraft, rail, loading equipment, car, hybrid, or other vehicle, wheeled or not wheeled. The present invention need not be limited to vehicle 1302. Vehicle 1302 need not be a forklift. There can be gap 1400 to allow bending of leg portion 120.

Tables 1.1 and 1.2 show derivations based on underlying data from a finite elements analysis (FEA). Tables 1.1 and 1.2 are based on a possible embodiment of the present invention.

The FEA model was built in Algor® software, version 19. Algor is a software package available from AutoDesk Inc. of Pittsburgh, Pa. Tables 1.1 and 1.2 are based on a 2-D model on the Y-Z plane. In the analysis, thickness was programmed as an element property to simulate a three-dimensional model with 4-inch width. Tables 1.1 and 1.2 together show a non-limiting example of derivations and data in forty load cases, each successively testing five angles of applied force. The first angle, load case 1, can be perpendicular to force-receiving portion 122. Load cases 2-5 can be understood as off-angle load cases. In this non-limiting example show by way of non-limiting FEA, off-angle load cases can be other than 1, 6, 11, 16, 21, 26, 31, 36, which can be perpendicular load cases at a 90-degree angle. Load cases can be testable in series as shown in Tables 1.1 and 1.2, for example, 1-5, 6-10, 11-15, 16-20, 21-25, 26-30, 31-35, and 36-40. Each second, third, fourth, and fifth load case in each five-case series can be off-angle from an immediately preceding perpendicular load case at approximately 26.5 and 14 degrees to either side of the immediately preceding load case, In a possible embodiment, unknown force 900 or "F" can be later determined using the present invention. In an embodiment, "F" or unknown force 900 can be found by compensating for off-angle conditions. In this non-limiting example, load cases were resolved in the FEA with a substantially L-shaped beam four inches wide, at eight points spaced 10 inches to 80 inches from the root, along force-receiving portion 122. Each node refers to a different sensor 51-54 position having x, y, and z values. The values can be calculated, as shown in columns 4 and 7.

FIG. 14 is a possible mounted embodiment of the present invention.

Gap 1400 is shown in FIG. 14 with mounting surface 1300, vehicle 1302, sensors 51 and 53, and L-beam 100.

Gap 1400 can be a space proximate to mounting surface 1300. A benefit of gap 1400 is to facilitate bending of leg portion 120 when leg portion 120 is mounted, for example, to mounting surface 1302.

FIG. 15 is a possible dual-L-beam embodiment of the present invention.

Pair of L-beams 1500 is shown in FIG. 15, with sensors 51 and 53, and L-beam 100. Sensors 52 and 54 can be present but are obscured from this particular view.

Figure 16:
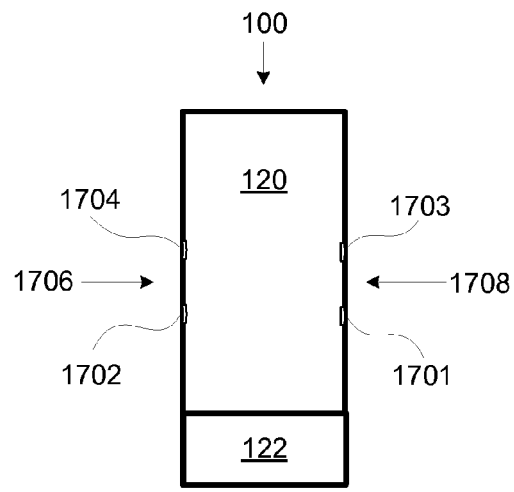
FIG. 16 is a perspective view distal to the force-receiving portion of a possible embodiment of the present invention.

FIG. 16 is a perspective view distal to the force-receiving portion of a possible embodiment of the present invention.

Lateral sensors 1701, 1702, 1703, and 1704 are shown in FIG. 16, with L-beam 100, leg portion 120, force-receiving portion 122, first lateral side 1706, and second lateral side 1708.

Figure 17:
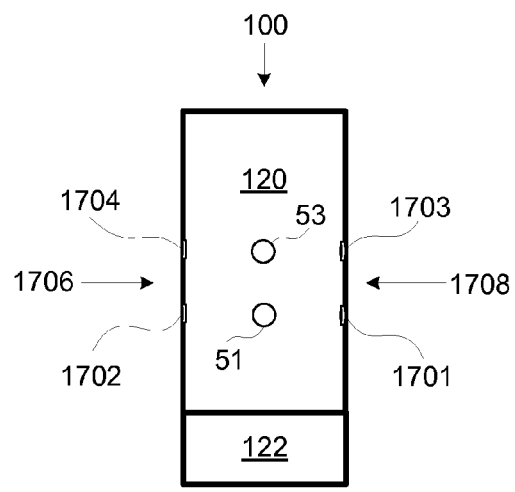
FIG. 17 is a front perspective view of a possible embodiment of the present invention with lateral sensors.

FIG. 17 is another perspective view distal to the force-receiving portion of a possible embodiment of the present invention with lateral sensors to correct for tilt and off-level condition.

Lateral sensors 1701, 1702, 1703, and 1704 are shown in FIG. 17, with sensor 51, sensor 53, L-beam 100, leg portion 120, and force-receiving portion 122, first lateral side 1706, and second lateral side 1708.

Lateral sensors 1701, 1702, 1703, and 1704 can be sensors on lateral sides of leg portion 120 of L-beam 100. Other than the lateral tilt detectable by lateral sensors 1701-1704, each of lateral sensors 1701-1704 can be used as each of sensors 51-54, to detect tilt. A benefit over conventional bending beam systems is to provide lateral sensing capabilities. In less preferred embodiments, lateral sensors 1700, 1701, 1702, and 1703 can be on force-receiving portion 122 of L-beam 100. In most preferred embodiments, lateral sensors 1701, 1702, 1703, and 1704 can correct for lateral tilt conditions where the plane of L-beam 100 (reference line V-VI in FIG. 1) is later-ally tilted. In some possible embodiments, lateral sensors 1701, 1702, 1703, and 1704 can be absent. A benefit of lateral sensors 1701, 1702, 1703, and 1704 can be to detect tilt conditions when L-beam 100 is tilted off the "z" axis (reference line V-VI, FIGS. 6 and 7). A benefit of the present invention with lateral sensors can be to facilitate correction for off-level condition.

First lateral side 1706 and second lateral side 1708 can be analogous to compression side and tension side 102 and 104; whether first lateral side measures compression or tension depends on which way tilt occurs. Thus, a difference in lateral sensors 1701-1704 when used with sensors 51-54 is that sensors 1701-1704 can measure compression or tension to resolve tilt. Kutsay (U.S. Pat. No. 3,724,575) can illustrate a calculation using two in-beam sensors within a cavern formed inside a beam. However, Kutsay does not teach or fairly suggest lateral sensors 1701-1704, and does not teach or fairly suggest lateral sides 1706 and 1708. Furthermore, Kutsay does not teach or fairly suggest sensors 51-54 in conjunction with lateral sensors 1701-1704; nor does Kutsay teach or fairly suggest off-angle detection or correction. Further, Kutsay does not teach or fairly suggest determining unknown location 800 of the load.

Figure 18:
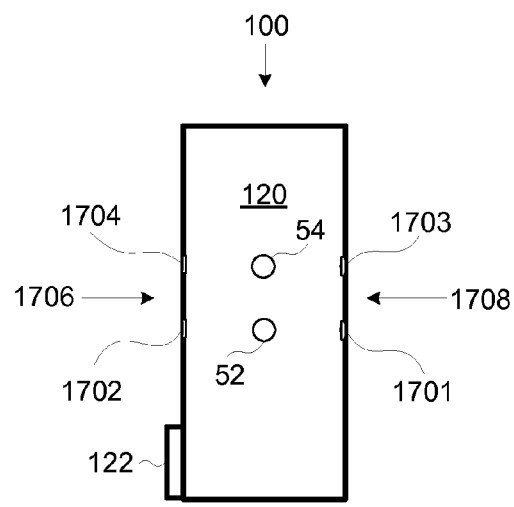
FIG. 18 is an opposite perspective view of a possible embodiment of the present invention.

FIG. 18 is an opposite perspective view of a possible embodiment of the present invention.

Force-receiving portion 122 is shown extending away from this opposite perspective view in FIG. 18.

Lateral sensors 1701, 1702, 1703, and 1704 are shown in FIG. 18, with sensor 52, sensor 54, L-beam 100, leg portion 120, force-receiving portion 122, first lateral side 1706, and second lateral side 1708.

Figure 19:
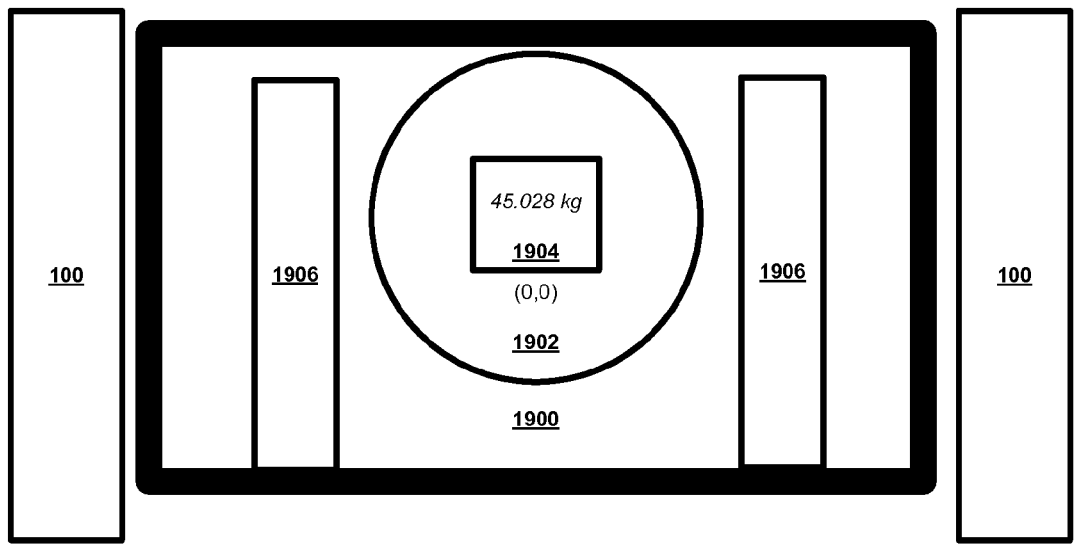
FIG. 19 is a monitor display view of a possible embodiment of the present invention.

FIG. 19 is a display view of a possible embodiment of the present invention.

Display 1900 is shown in FIG. 19 with location indicator 1902, strain indicator 1904, and L-beam indicators 1906. L-beams 100 are shown in FIG. 19 by way of non-limiting illustration to distinguish physical L-beams 100 from L-beam indicators 1906 shown in display 1900.

Display 1900 can be a digital monitor, liquid crystal display, or human readable device. Display 1900 can be a screen capable of showing a visual image. Display 1900 can be any device which is capable of displaying a visual image, and capable of refreshing or updating the visual image shown on display 1900.

Location indicator 1902 can indicate a location of a load. Location indicator 1902 can indicate unknown location 800 as measured by sensors 51, 52, 53, and 54 on one or more L-beams 100. Location indicator 1902 can be shown on any axis, or in multiple dimensions on more than one axis. Location indicator 1902 can have a pixel color different than the background color. Location indicator 1902 can indicate an approximate position of load based on a balanced calculation of two L-beams 100. In a possible embodiment, two L-beams 100 can be shown in display 1900 with two L-beam indicators 1906. In a preferred embodiment, location indicator 1902 can be round. By way of non-limiting illustration, load indicator can be circular, elliptical, "X"-shaped, irregularly shaped, or have a shape symbolizing an object being weighed. Location indicator 1902 can be a shape shown in display 1900. Location indicator 1902 can-proximately show location and magnitude in most preferred embodiments. Unknown location 800 can be resolved by the present invention and can be shown as resolved location 1908 on display 1900.

Strain indicator 1904 can show a character or symbol indicating the force of the load. Force can be determined by knowing the outputs of sensors. Strain indicator 1904 can display the amount of the load in units, e.g., lbs., kg, tons, or any other unit of measure relevant to weight or force. In some possible embodiments, the present invention can be configured to measure acceleration. One of ordinary skill in the pertinent art would know how to configure an accelerometer instead of a strain gauge consistent with the present invention.

L-beam indicator 1906 can provide a visual depiction of L-beam 100 or a plurality of L-beams 100, preferably two L-beams 100.

Figure 20:
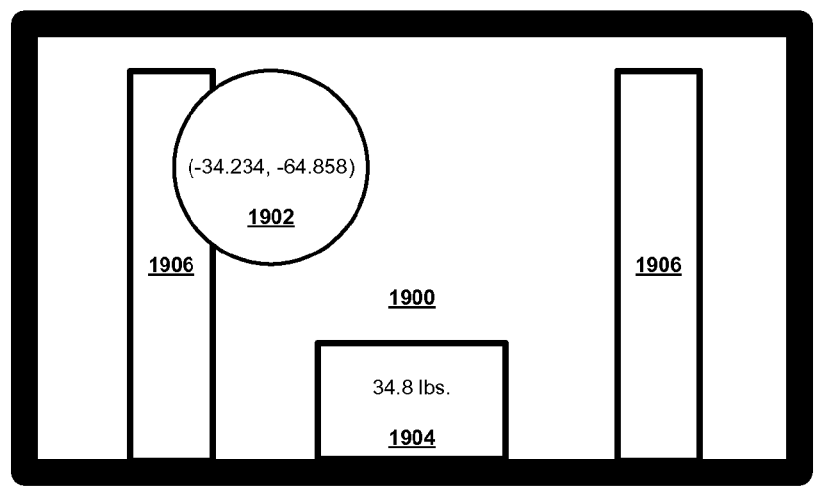
FIG. 20 is a monitor display view of a possible embodiment of the present invention.

FIG. 20 is a monitor display view of a possible embodiment of the present invention.

Display 1900 is shown in FIG. 19 with location indicator 1902, strain indicator 1904, and L-beam indicators 1906.

A method for finding location of load laterally can have a locator comprising an "x" input and a "y" input. A display (FIGS. 19-20) can facilitate the locator to have a medium for output to be shown. A benefit of the present invention can be to enhance safety and/or identify other issues such as undesirable items in waste or a water stream. There can be a safety threshold to be compared to the inputs from L-beam 100 sensors 51-54 and/or 1701-1704.

A method for verifying delivery can use L-beam 100 with force-receiving portion 122 and leg portion 120. By way of non-limiting illustration, the method for verifying delivery can be performed by receiving onto the force-receiving portion an object capable of being dispensed from a vending machine, receiving a weight input via the leg portion, receiving a location input via the leg portion, dropping an object onto the force-receiving portion, verifying a known weight against the weight input, and receiving an absence of weight input resulting from the object when the object is lifted from the force-receiving portion. In an embodiment, the object can be any item with a predeterminable attribute, such as weight, height, or location, such as a pharmaceutical drug having a known weight. In a preferred embodiment, he method for verifying delivery can record time in a log or database. By way of non-limiting illustration, the method for verifying delivery can further include any of the following: identifying a requestor, verifying a chain of custody, verifying retrieval of property from a locked container, verifying retrieval of property from a workplace, verifying retrieval of a gown from a semiconductor facility, verifying retrieval of a gown from a surgical facility, and/or verifying return of a property to a patient; and/or verifying return of a property to an inmate. Verification can be performed by checking against the weight of the given object being deposited and the weight of the object being returned.

Figure 21:
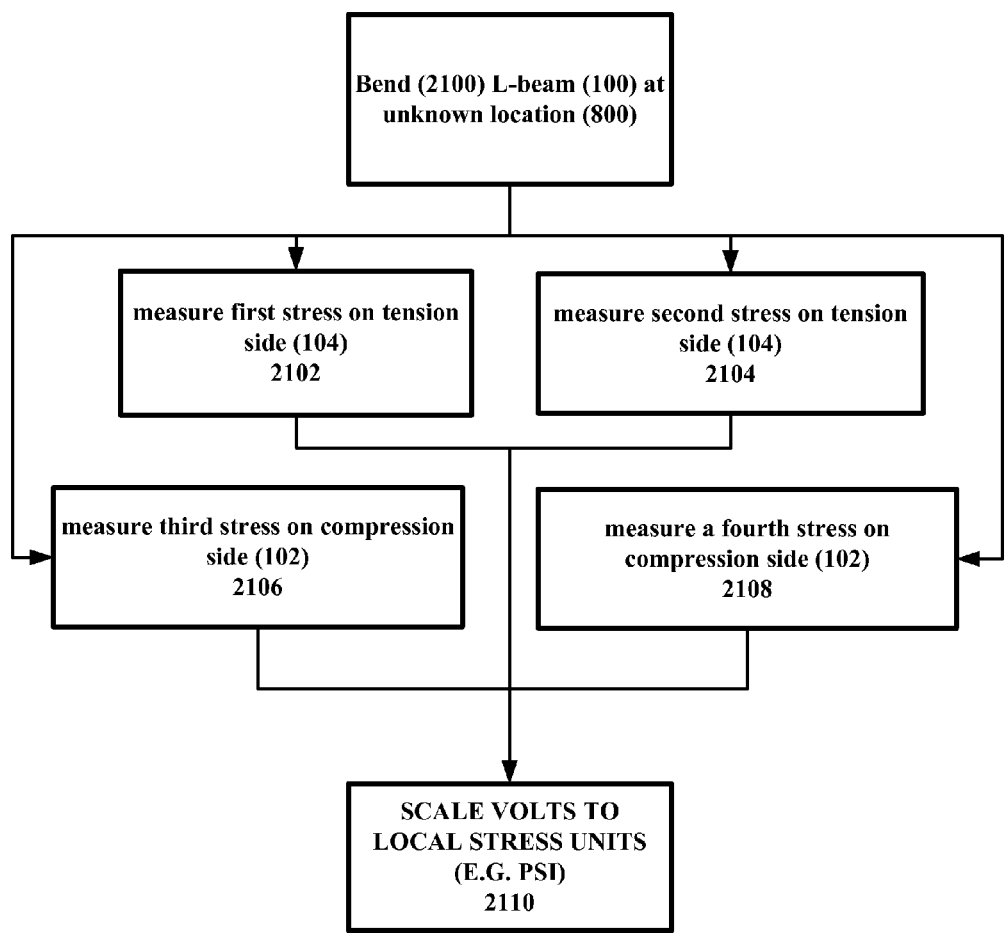
FIG. 21 is a flow diagram of a possible embodiment of the present invention.

FIG. 21 is a method diagram of the present invention.

Bending 2100 is shown in FIG. 20, with measuring 2102, 2104, 2106, and 2108, and scaling output to local stress units 2110.

Bending 2100 can be produced by exertion of force on L-beam 100. In some preferred embodiments, bending 2100 can be at unknown location 800 on force-receiving portion 122 where L-beam 100 has a compression side 102 and a tension side 104.

Measuring 2102, 2104, 2106, and 2108 can be performed by sensing a first local tension-side stress at a first location with sensors 51 and 53 or conversely with 52 and 54. Measurements from 2102 and 2104 can be on tension side 104, and measurement from 2106 and 2108 can measure compression side 102. The two pairs of opposing stress measurements obtained by measuring 2102, 2104, 2106, and 2108 can be used to scale output 2010.

Scaling output 2110 can provide local units of measure of stress. In some preferred embodiments, scaling output 2110 can be performed by linearly scaling millivolt output to local bending stress in PSI. A benefit of scaling output 2110 can be to provide large delta values. Further, knowing the L-beam 100 geometry and L-beam 100 material properties, notably, Young's modulus for L-beam 100 material. By way of non-limiting illustration, the Young's modulus of steel can be roughly 30 million PSI and can be fairly constant throughout the elastic range. Further, by way of non-limiting illustration, the Young's modulus of aluminum is approximately 10 million PSI. Thus, the local stress in the vicinity of given sensor 51, 52, 53, and 54 or lateral sensor 1701, 1702, 1703, and 1704 can be determined via knowing the L-beam 100 material's Young's modulus and the characteristics of sensors 51, 52, 53, and 54. In most preferred embodiments, sensors are Wheatstone bridges and the character of each sensor's output is ascertainable and known.

In addition, by way of non-limiting illustration, sensors 51, 52, 53, and 54 can be calibrated, conditioned, and constructed to read in the same units of local stress as appear in the calculations. Wheatstone bridges typically read in millivolts per volt, and its output can be conditioned or read in local stress units. One of ordinary skill in the pertinent art would know that a Wheatstone bridge conditioner and readout can be constructed to read in local stress units, such as pounds per square inch (PSI). Tables 1.2, 1.2, and 2 reflect non-limiting examples using PSI. It is consistent with the spirit of the present invention to use local stress units other than PSI.

FIG. 22 is a diagram of a force-sensing method of a possible embodiment of the present invention.

A method of "determining unknown force" 2200 can be performed on unknown force 900 via sensors 51-54 (or, in the cases of tilt, lateral sensors 1701-1704, FIGS. 16-18) and using L-beam geometry. Dimensions and material of L-beam 100 will be known. Values for distances 200, 300, 400, 402, 500, 600 and 602 can be known from beam geometry. In a possible embodiment, sensor measurements can be obtained from sensor 53 and sensor 51. U.S. Pat. No. 3,724,575 to Kutsay teaches an approach to determining force on a beam.

Sensors 51-54 and 1701-1704 each can have a value associated therewith. By way of non-limiting illustration, 651 and 653 can each represent stress (a) after force is applied to force-receiving portion 122.

Geometric constant 2202 can be obtained by knowing the geometry of L-beam 100. By way of non-limiting illustration, force-receiving portion 122 can be 2" thick and 4" wide. Length of force-receiving portion can be substantially fixed.

"b" variable in $4^{th}$ line of FIG. 22 can be distinguished from b1 or b0. $b_0$ can be the width of the beam. $b_1$ can be the vertical distance between sensors, for example, distance 402 "b1" in FIG. 4. Geometric $b_0$ and $b_1$ are shown in the numerator of the first equation in FIG. 22.

FIG. 23 is a diagram of a location-sensing method of a possible embodiment of the present invention.

Determine unknown location 2300 can be performed on unknown location 800 via sensors 51-54. The combination of at least two sensors of 51-54 with lateral sensors 1701-1704 can be used in three-dimensional calculation, but are generally not preferred to "determine unknown location" 2300, and can be used to "determine unknown force" 2200 consistent with this specification. In an embodiment, the following can be performed to "determine unknown location" 2300: receiving unknown force 900 at unknown location 800 "x" oriented along force-receiving portion 122 of L-beam 100, sensing a tension stress value on the L-beam to derive a first stress output "$t_1$"; and sensing a compression stress value on the L-beam to derive a second stress output "$c_1$"; where a thickness "$h_1$" (200) of leg portion of L-beam is known; where a distance "$d_1$" (202) from the sensor to the horizontal section of L-beam or the length of the vertical section is known; where a quotient "$q_1$" is obtained from the sum of $t_1$ and $c_1$; and where $x=((t_1/q_1)*h_1)/d_1$ approximates the unknown location oriented along the L-beam. In some embodiments, two L-beams 100 can be used such as shown in FIGS. 13-15, and the location of the load in the X direction can be calculated knowing the load on each fork separately based on the teachings of this specification; thus, the lateral location of the load being shown. For example, see FIGS. 19 and 20.

Figure 24:
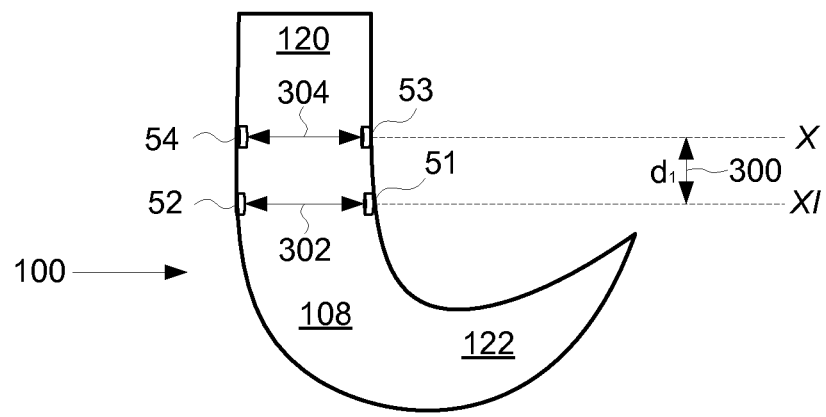
FIG. 24 is a side view of a possible embodiment of the present invention.

FIG. 24 is a side view of a possible embodiment of the present invention.

A non-limiting illustration of L-beam 100 is shown in FIG. 24 as a curved hook.

Figure 25:
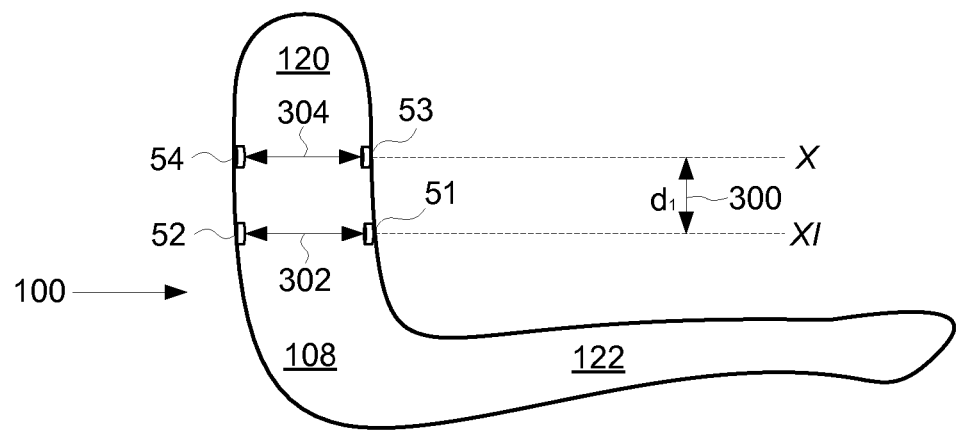
FIG. 25 is a side view of a possible embodiment of the present invention.

FIG. 25 is a side view of a possible embodiment of the present invention.

A non-limiting illustration of L-beam 100 is shown in FIG. 25. L-beam 100 can also have portions which are non-straight, smoothed, or irregular.

Figure 26:
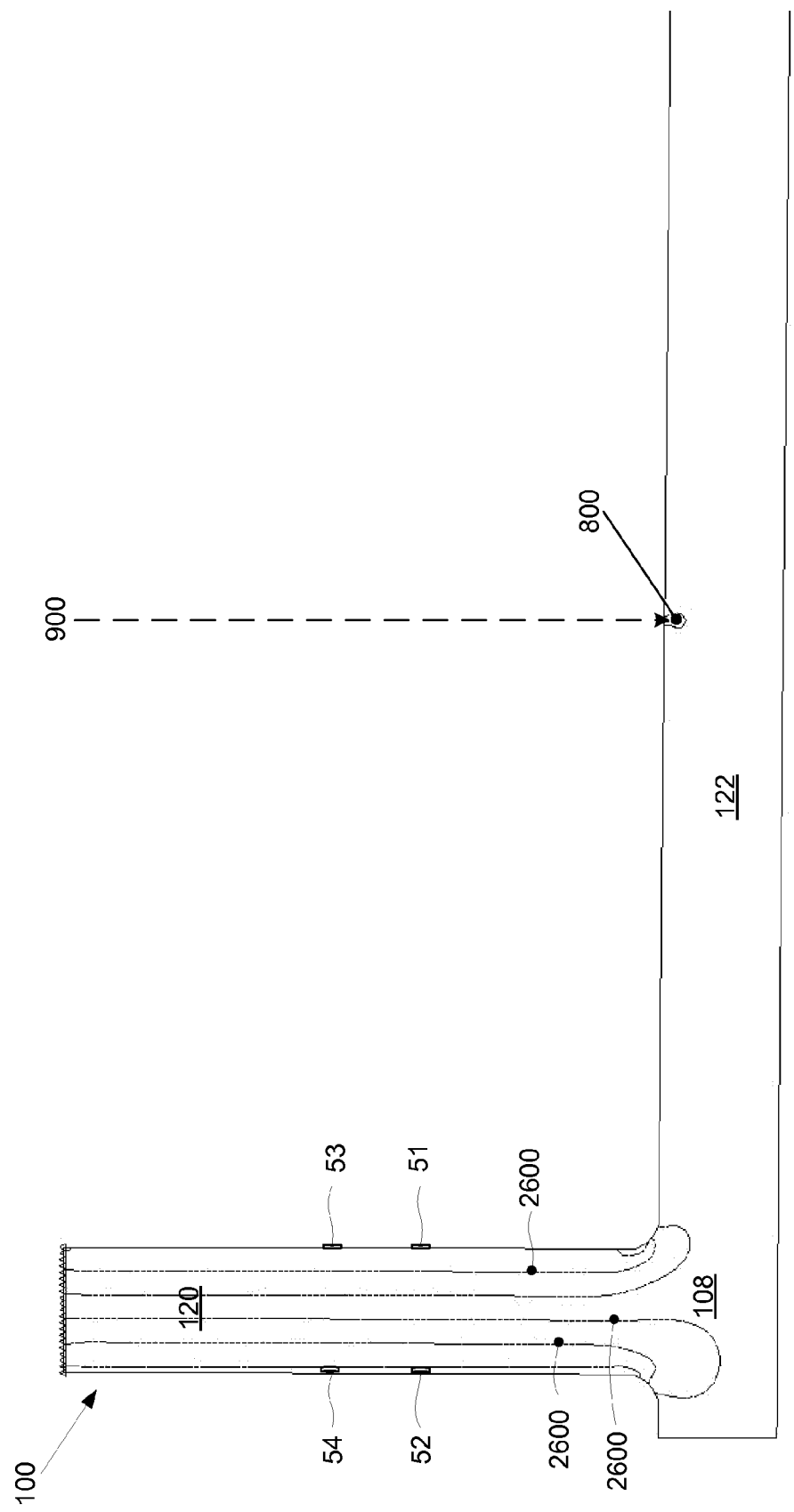
FIG. 26 is a topographical map of test data relating to the present invention.

FIG. 26 is a topographical map of test data relating to the present invention.

ZZ tensor line 2600 is shown in FIG. 26, with L-beam 100, sensors 51-54, adjoining region 108, leg portion 120, and force-receiving portion 122.

When unknown force 900 is applied to L-beam 100, stress near adjoining portion 108 can adversely affect sensor readings near adjoining region 108. FIG. 26 shows why sensors 51-54 are preferably placed away from adjoining region 108.

Several instances of ZZ tensor line 2600 can be seen in FIG. 26 while unknown force 900 is exerted on L-beam 100, as here, onto force-receiving portion 122.

FIG. 27 shows a finite elements analysis of a possible embodiment of the present invention with data labels.

Figure 28:
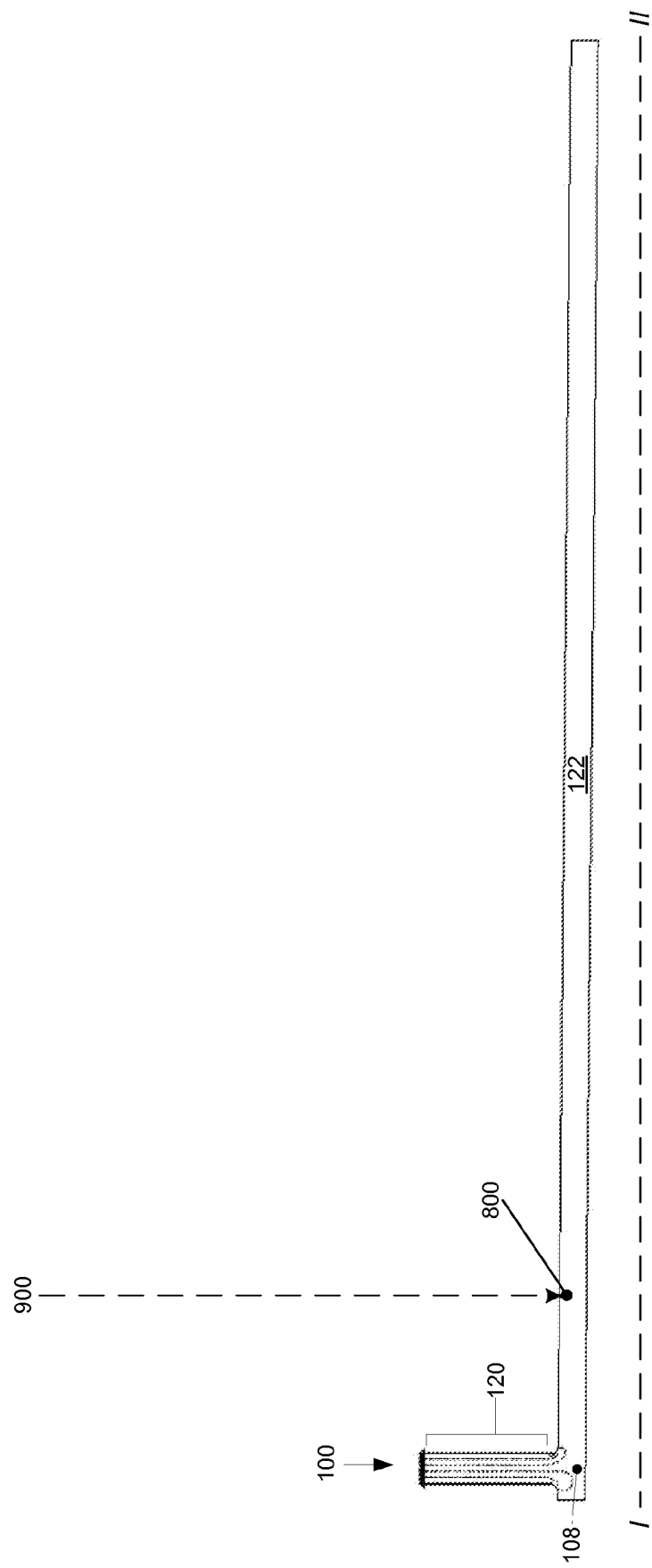
FIG. 28 shows an overall view of a finite elements analysis of a possible embodiment of the present invention.

FIG. 28 shows an overall view of a finite elements analysis of a possible embodiment of the present invention.

Figure 29:
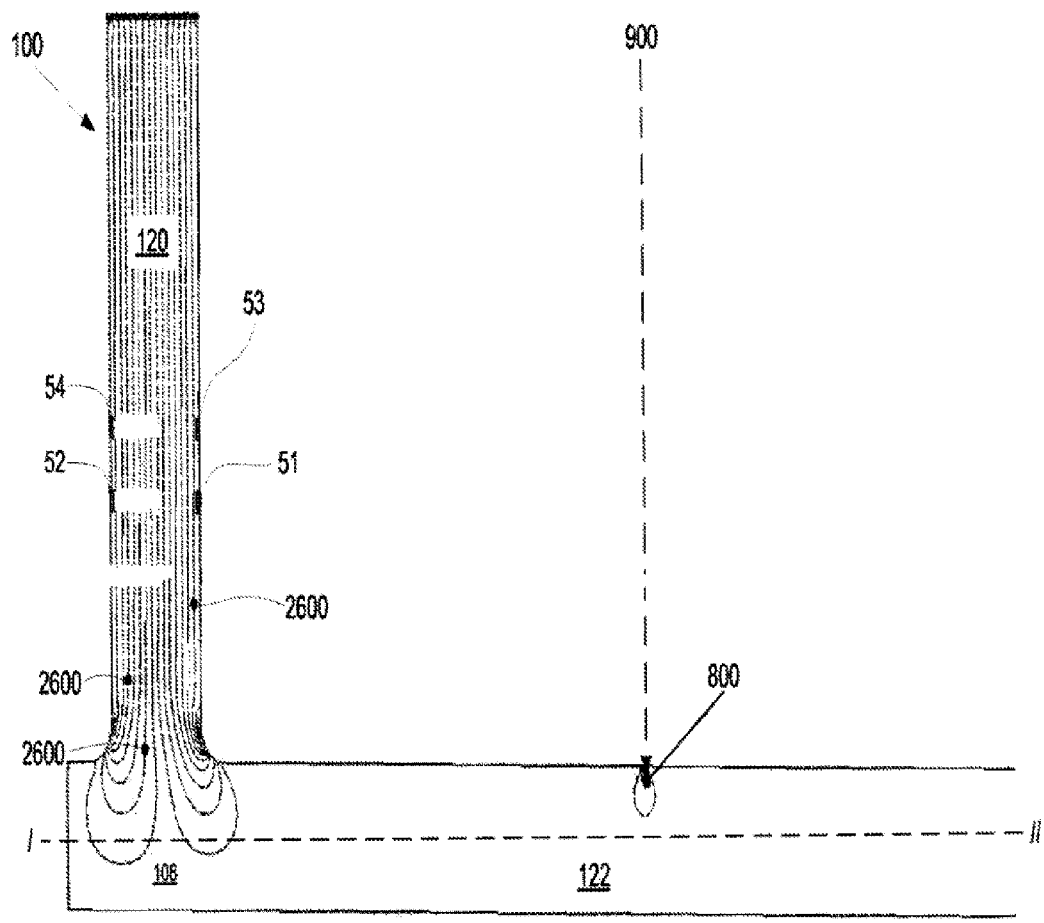
FIG. 29 shows a finite elements analysis of a possible embodiment of the present invention with data labels.

FIG. 29 shows a finite elements analysis of a possible embodiment of the present invention with data labels. FIG. 29 shows a more granular view of ZZ tensor lines in relation to the present invention.

FIGS. 26-29 can be further understood as non-limiting embodiments, with reference to Tables 1.1 and 1.2, below.

TABLE 1.1

| A | B | C | D | E | F | G |
|---|---|---|---|---|---|---|
| | | | Source | | | |
| Load Case | FROM FEA node#20062 X = 0, Y = −2, Z = 2.5 compression (lowest rear) #2 *not used due to observed inaccuracy | FROM FEA node#20082 X = 0, Y = 0, Z = 2.5 tensile (lowest front) #1 in drawing *not used due to observed inaccuracy | SUM OF B + C = node#20062 + node#20082 Calculated lower tensile and lower compression | FROM FEA node#20272 X = 0, Y = −2, Z = 3.5 compression (middle rear) #4 | FROM FEA node#20292 X = 0, Y = 0, Z = 3.5 tensile (middle front) #3 in drawing | SUM OF E + F = node#20272 + node#20292 Adding results from front and rear nodes to get stress caused by downward force alone |
| 1 | −400.67 | 424.28 | 23.62 | −399.97 | 425.03 | 25.06 |
| 2 | −316.47 | 337.53 | 21.06 | −299.04 | 321.47 | 22.42 |
| 3 | −365.98 | 388.86 | 22.88 | −356.19 | 380.51 | 24.32 |
| 4 | −411.43 | 434.37 | 22.94 | −419.86 | 444.17 | 24.31 |
| 5 | −400.26 | 421.45 | 21.18 | −416.44 | 438.85 | 22.41 |
| 6 | −776.26 | 798.65 | 22.39 | −774.94 | 800.07 | 25.13 |
| 7 | −652.41 | 672.38 | 19.97 | −634.42 | 656.91 | 22.48 |
| 8 | −730.36 | 752.05 | 21.69 | −719.96 | 744.35 | 24.38 |
| 9 | −775.80 | 797.56 | 21.76 | −783.63 | 808.01 | 24.38 |
| 10 | −736.20 | 756.29 | 20.09 | −751.82 | 774.30 | 22.47 |
| 11 | −1151.85 | 1173.02 | 21.17 | −1149.90 | 1175.10 | 25.20 |
| 12 | −988.35 | 1007.22 | 18.88 | −969.80 | 992.35 | 22.55 |
| 13 | −1094.73 | 1115.24 | 20.51 | −1083.73 | 1108.19 | 24.45 |
| 14 | −1140.18 | 1160.75 | 20.57 | −1147.40 | 1171.85 | 24.45 |
| 15 | −1072.14 | 1091.14 | 19.00 | −1087.20 | 1109.74 | 22.54 |
| 16 | −1527.44 | 1547.39 | 19.95 | −1524.87 | 1550.14 | 25.27 |
| 17 | −1324.28 | 1342.07 | 17.78 | −1305.18 | 1327.79 | 22.61 |
| 18 | −1459.11 | 1478.43 | 19.32 | −1447.50 | 1472.02 | 24.52 |
| 19 | −1504.55 | 1523.94 | 19.39 | −1511.17 | 1535.69 | 24.52 |
| 20 | −1408.07 | 1425.98 | 17.91 | −1422.58 | 1445.18 | 22.60 |
| 21 | −1903.02 | 1921.75 | 18.73 | −1899.83 | 1925.17 | 25.34 |
| 22 | −1660.22 | 1676.91 | 16.69 | −1640.56 | 1663.23 | 22.67 |
| 23 | −1823.48 | 1841.62 | 18.14 | −1811.27 | 1835.86 | 24.59 |
| 24 | −1868.93 | 1887.13 | 18.20 | −1874.94 | 1899.52 | 24.58 |
| 25 | −1744.01 | 1760.83 | 16.81 | −1757.96 | 1780.62 | 22.66 |
| 26 | −2278.61 | 2296.12 | 17.51 | −2274.80 | 2300.21 | 25.41 |
| 27 | −1996.16 | 2011.76 | 15.60 | −1975.94 | 1998.68 | 22.74 |
| 28 | −2187.86 | 2204.81 | 16.95 | −2175.04 | 2199.70 | 24.66 |
| 29 | −2233.30 | 2250.32 | 17.02 | −2238.71 | 2263.36 | 24.65 |
| 30 | −2079.95 | 2095.67 | 15.72 | −2093.34 | 2116.06 | 22.73 |
| 31 | −2654.20 | 2670.49 | 16.29 | −2649.76 | 2675.25 | 25.49 |
| 32 | −2332.10 | 2346.60 | 14.51 | −2311.32 | 2334.12 | 22.80 |
| 33 | −2552.23 | 2568.00 | 15.77 | −2538.81 | 2563.54 | 24.73 |
| 34 | −2597.68 | 2613.51 | 15.83 | −2602.48 | 2627.20 | 24.72 |
| 35 | −2415.89 | 2430.51 | 14.63 | −2428.72 | 2451.51 | 22.79 |
| 36 | −3029.79 | 3044.86 | 15.06 | −3024.73 | 3050.28 | 25.56 |

TABLE 1.1-continued

| | | | Source | | | |
|---|---|---|---|---|---|---|
| A | B | C | D | E | F | G |
| Load Case | FROM FEA node#20062 X = 0, Y = −2, Z = 2.5 compression (lowest rear) #2 *not used due to observed inaccuracy | FROM FEA node#20082 X = 0, Y = 0, Z = 2.5 tensile (lowest front) #1 in drawing *not used due to observed inaccuracy | SUM OF B + C = node#20062 + node#20082 Calculated lower tensile and lower compression | FROM FEA node#20272 X =0, Y = −2, Z = 3.5 compression (middle rear) #4 | FROM FEA node#20292 X = 0, Y = 0, Z = 3.5 tensile (middle front) #3 in drawing | SUM OF E + F = node#20272 + node#20292 Adding results from front and rear nodes to get stress caused by downward force alone |
| 37 | −2668.03 | 2681.44 | 13.41 | −2646.70 | 2669.56 | 22.86 |
| 38 | −2916.61 | 2931.19 | 14.58 | −2902.58 | 2927.38 | 24.80 |
| 39 | −2962.05 | 2976.70 | 14.65 | −2966.25 | 2991.04 | 24.80 |
| 40 | −2751.82 | 2765.36 | 13.54 | −2764.10 | 2786.95 | 22.85 |

Load cases 1-40 are shown in Tables 1.1 and 1.2. Columns B and C, showing nodes #20062 and 20082 can correspond to sensors 55 and 56 (FIG. 2). Sensors 55 and 56 can be absent in the present invention due to observed inaccuracy near adjoining region 108. Load cases are provided in groups of five. Note that Tables 1.1 and 1.2 can be considered together, but are shown separately given page width limitations. The present invention is not limited to this specific embodiment.

TABLE 1.2

| Load case | H (sensor 54) node #20482 X = 0, Y = −2, Z = 4.5 (PSI) | I (sensor 53) node #20502 X = 0, Y = 0, Z = 4.5 (PSI) | J 20482 + 20502 calculated (PSI) | K Calculated Force (F) in the "y" direction "F$_y$" (PSI) | L Load without angle correction (PSI) | M Corrected Force (F) |
|---|---|---|---|---|---|---|
| 1 | −399.99 | 425.01 | 25.03 | −0.05 | 100.11 | 100.11 |
| 2 | −282.29 | 304.68 | 22.39 | −44.77 | 89.55 | 100.11 |
| 3 | −347.12 | 371.40 | 24.28 | −24.30 | 97.12 | 100.12 |
| 4 | −428.97 | 453.25 | 24.28 | 24.21 | 97.12 | 100.09 |
| 5 | −433.23 | 455.61 | 22.38 | 44.68 | 89.53 | 100.07 |
| 6 | −774.97 | 800.03 | 25.05 | −0.11 | 100.21 | 100.21 |
| 7 | −617.69 | 640.10 | 22.41 | −44.82 | 89.64 | 100.22 |
| 8 | −710.91 | 735.21 | 24.31 | −24.36 | 97.22 | 100.23 |
| 9 | −792.76 | 817.07 | 24.30 | 24.15 | 97.22 | 100.17 |
| 10 | −768.63 | 791.03 | 22.41 | 44.63 | 89.63 | 100.12 |
| 11 | −1149.96 | 1175.04 | 25.08 | −0.17 | 100.31 | 100.31 |
| 12 | −953.09 | 975.52 | 22.43 | −44.88 | 89.73 | 100.33 |
| 13 | −1074.70 | 1099.03 | 24.33 | −24.42 | 97.32 | 100.34 |
| 14 | −1156.55 | 1180.88 | 24.33 | 24.09 | 97.32 | 100.25 |
| 15 | −1104.02 | 1126.45 | 22.43 | 44.57 | 89.72 | 100.18 |
| 16 | −1524.95 | 1550.05 | 25.10 | −0.23 | 100.42 | 100.42 |
| 17 | −1288.49 | 1310.94 | 22.46 | −44.93 | 89.82 | 100.43 |
| 18 | −1438.49 | 1462.84 | 24.36 | −24.48 | 97.42 | 100.45 |
| 19 | −1520.35 | 1544.70 | 24.35 | 24.03 | 97.41 | 100.34 |
| 20 | −1439.42 | 1461.88 | 22.45 | 44.52 | 89.81 | 100.24 |
| 21 | −1899.94 | 1925.06 | 25.13 | −0.29 | 100.52 | 100.52 |
| 22 | −1623.89 | 1646.36 | 22.48 | −44.99 | 89.91 | 100.54 |
| 23 | −1802.28 | 1826.66 | 24.38 | −24.54 | 97.52 | 100.56 |
| 24 | −1884.14 | 1908.51 | 24.38 | 23.97 | 97.51 | 100.42 |
| 25 | −1774.82 | 1797.30 | 22.48 | 44.46 | 89.90 | 100.30 |
| 26 | −2274.92 | 2300.08 | 25.16 | −0.35 | 100.62 | 100.62 |
| 27 | −1959.28 | 1981.79 | 22.50 | −45.04 | 90.00 | 100.65 |
| 28 | −2166.07 | 2190.48 | 24.40 | −24.60 | 97.62 | 100.67 |
| 29 | −2247.93 | 2272.33 | 24.40 | 23.91 | 97.61 | 100.50 |
| 30 | −2110.22 | 2132.72 | 22.50 | 44.41 | 89.99 | 100.35 |
| 31 | −2649.91 | 2675.09 | 25.18 | −0.42 | 100.72 | 100.72 |
| 32 | −2294.68 | 2317.21 | 22.52 | −45.10 | 90.10 | 100.75 |

TABLE 1.2-continued

| Load case | H (sensor 54) node #20482 X = 0, Y = −2, Z = 4.5 (PSI) | I (sensor 53) node #20502 X = 0, Y = 0, Z = 4.5 (PSI) | J 20482 + 20502 calculated (PSI) | K Calculated Force (F) in the "y" direction "F$_y$" (PSI) | L Load without angle correction (PSI) | M Corrected Force (F) |
|---|---|---|---|---|---|---|
| 33 | −2529.86 | 2554.29 | 24.43 | −24.66 | 97.72 | 100.78 |
| 34 | −2611.72 | 2636.15 | 24.43 | 23.85 | 97.71 | 100.58 |
| 35 | −2445.62 | 2468.14 | 22.52 | 44.35 | 90.08 | 100.41 |
| 36 | −3024.90 | 3050.10 | 25.21 | −0.48 | 100.83 | 100.83 |
| 37 | −2630.08 | 2652.63 | 22.55 | −45.15 | 90.19 | 100.86 |
| 38 | −2893.65 | 2918.11 | 24.45 | −24.72 | 97.82 | 100.89 |
| 39 | −2975.51 | 2999.96 | 24.45 | 23.78 | 97.81 | 100.66 |
| 40 | −2781.02 | 2803.56 | 22.54 | 44.30 | 90.17 | 100.47 |
| 1 | −399.99 | 425.01 | 25.03 | 1133.34 | 100.11 | 1137.75 |
| 2 | −282.29 | 304.68 | 22.39 | 812.45 | 89.55 | 817.37 |
| 3 | −347.12 | 371.40 | 24.28 | 990.37 | 97.12 | 995.12 |
| 4 | −428.97 | 453.25 | 24.28 | 1208.64 | 97.12 | 1212.54 |
| 5 | −433.23 | 455.61 | 22.38 | 1214.93 | 89.53 | 1218.22 |
| 6 | −774.97 | 800.03 | 25.05 | 2133.35 | 100.21 | 2135.70 |
| 7 | −617.69 | 640.10 | 22.41 | 1706.89 | 89.64 | 1709.24 |
| 8 | −710.91 | 735.21 | 24.31 | 1960.52 | 97.22 | 1962.93 |
| 9 | −792.76 | 817.07 | 24.30 | 2178.79 | 97.22 | 2180.96 |
| 10 | −768.63 | 791.03 | 22.41 | 2109.37 | 89.63 | 2111.27 |
| 11 | −1149.96 | 1175.04 | 25.08 | 3133.36 | 100.31 | 3134.96 |
| 12 | −953.09 | 975.52 | 22.43 | 2601.32 | 89.73 | 2602.87 |
| 13 | −1074.70 | 1099.03 | 24.33 | 2930.67 | 97.32 | 2932.28 |
| 14 | −1156.55 | 1180.88 | 24.33 | 3148.94 | 97.32 | 3150.45 |
| 15 | −1104.02 | 1126.45 | 22.43 | 3003.80 | 89.72 | 3005.14 |
| 16 | −1524.95 | 1550.05 | 25.10 | 4133.37 | 100.42 | 4134.59 |
| 17 | −1288.49 | 1310.94 | 22.46 | 3495.76 | 89.82 | 3496.91 |
| 18 | −1438.49 | 1462.84 | 24.36 | 3900.82 | 97.42 | 3902.04 |
| 19 | −1520.35 | 1544.70 | 24.35 | 4119.09 | 97.41 | 4120.25 |
| 20 | −1439.42 | 1461.88 | 22.45 | 3898.24 | 89.81 | 3899.27 |
| 21 | −1899.94 | 1925.06 | 25.13 | 5133.38 | 100.52 | 5134.36 |
| 22 | −1623.89 | 1646.36 | 22.48 | 4390.19 | 89.91 | 4391.11 |
| 23 | −1802.28 | 1826.66 | 24.38 | 4870.97 | 97.52 | 4871.95 |
| 24 | −1884.14 | 1908.51 | 24.38 | 5089.25 | 97.51 | 5090.18 |
| 25 | −1774.82 | 1797.30 | 22.48 | 4792.67 | 89.90 | 4793.51 |
| 26 | −2274.92 | 2300.08 | 25.16 | 6133.39 | 100.62 | 6134.21 |
| 27 | −1959.28 | 1981.79 | 22.50 | 5284.63 | 90.00 | 5285.40 |
| 28 | −2166.07 | 2190.48 | 24.40 | 5841.12 | 97.62 | 5841.94 |
| 29 | −2247.93 | 2272.33 | 24.40 | 6059.40 | 97.61 | 6060.18 |
| 30 | −2110.22 | 2132.72 | 22.50 | 5687.11 | 89.99 | 5687.82 |
| 31 | −2649.91 | 2675.09 | 25.18 | 7133.40 | 100.72 | 7134.11 |
| 32 | −2294.68 | 2317.21 | 22.52 | 6179.06 | 90.10 | 6179.72 |
| 33 | −2529.86 | 2554.29 | 24.43 | 6811.27 | 97.72 | 6811.97 |
| 34 | −2611.72 | 2636.15 | 24.43 | 7029.55 | 97.71 | 7030.23 |
| 35 | −2445.62 | 2468.14 | 22.52 | 6581.54 | 90.08 | 6582.16 |

TABLE 1.2-continued

| Load case | H (sensor 54) node #20482 X = 0, Y = −2, Z = 4.5 (PSI) | I (sensor 53) node #20502 X = 0, Y = 0, Z = 4.5 (PSI) | J 20482 + 20502 calculated (PSI) | K Calculated Force (F) in the "y" direction "$F_y$" (PSI) | L Load without angle correction (PSI) | M Corrected Force (F) |
|---|---|---|---|---|---|---|
| 36 | −3024.90 | 3050.10 | 25.21 | 8133.41 | 100.83 | 8134.03 |
| 37 | −2630.08 | 2652.63 | 22.55 | 7073.50 | 90.19 | 7074.07 |
| 38 | −2893.65 | 2918.11 | 24.45 | 7781.42 | 97.82 | 7782.04 |
| 39 | −2975.51 | 2999.96 | 24.45 | 7999.70 | 97.81 | 8000.30 |
| 40 | −2781.02 | 2803.56 | 22.54 | 7475.98 | 90.17 | 7476.52 |

Table 1.2 shows additional column data for load cases 1 through 40.

Table 1.2 shows additional column data for load cases 1 through 40.

TABLE 2

| Load case | N Location (approx.) |
|---|---|
| 1 | −10.65 |
| 2 | −8.41 |
| 3 | −9.53 |
| 4 | −11.78 |
| 5 | −12.90 |
| 6 | −20.62 |
| 7 | −18.38 |
| 8 | −19.50 |
| 9 | −21.75 |
| 10 | −22.87 |
| 11 | −30.57 |
| 12 | −28.32 |
| 13 | −29.45 |
| 14 | −31.69 |
| 15 | −32.82 |
| 16 | −40.50 |
| 17 | −38.25 |
| 18 | −39.38 |
| 19 | −41.62 |
| 20 | −42.74 |
| 21 | −50.40 |
| 22 | −48.16 |
| 23 | −49.28 |
| 24 | −51.52 |
| 25 | −52.65 |
| 26 | −60.29 |
| 27 | −58.05 |
| 28 | −59.17 |
| 29 | −61.41 |
| 30 | −62.53 |
| 31 | −70.16 |
| 32 | −67.92 |
| 33 | −69.04 |
| 34 | −71.28 |
| 35 | −72.40 |
| 36 | −80.00 |
| 37 | −77.77 |
| 38 | −78.89 |
| 39 | −81.12 |
| 40 | −82.24 |

Table 2 shows the same load cases 1-40 to resolve location using the present invention within relative degrees of accuracy.

Figure 30:
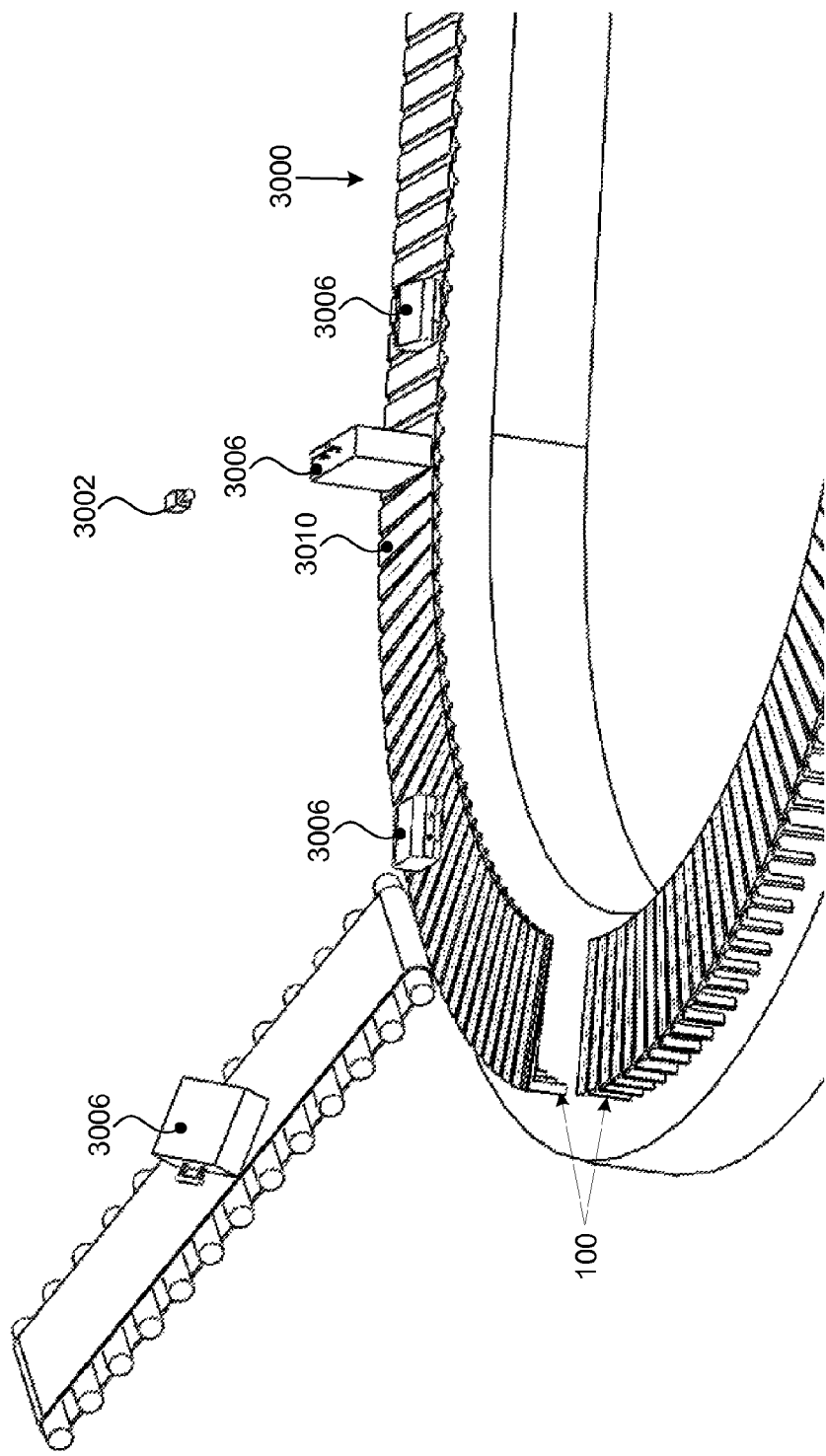
FIG. 30 shows an overall view of a possible embodiment of the present invention with conveyor and camera system.

FIG. 30 shows an overall view of a possible embodiment of the present invention with conveyor and camera system.

Conveyor 3000 is shown in FIG. 30, with plurality of L-beams 100, camera system 3002, voltage convertor 3006, load 3008, platform 3010, sensors 51, 52, 53, and 54, L-beam 100, leg portion 120, force-receiving portion 122, unknown location 800, and unknown force 900.

Conveyor 3000 can be any convertor system, whether industrial or retail, factory, warehouse, loading dock, or retail store, or any other environment in which a conveyor can be used.

Camera system 3002 can be any camera capable of storing or sending an image data. An image of unknown object on L-beam 100 or on conveyor 3000 can be photographed or recorded. Camera system 3002 can capture one or more images of one or more objects upon conveyor 3000. Camera system 3002 can have a memory internal to the camera or routed to be stored on a hard drive, internet storage, or cloud. Data or images from camera system 3002 can be combined with weight and/or location of unknown object on L-beam 100 on a hard drive. Camera system 3002 can be any existing camera or imaging device. A benefit of the present invention can be to track any product or object on conveyor 3000, which can provide a cross-reference to preexisting known information to provide validation and association with any entity and/or transaction.

Converter 3006 can be any electric current convertor, such as a voltage converter, hardware or software. In an embodiment, converter 3006 can comprise a software, preferably LabView, a wire, a CPU, a memory, a program comprising a multiplier from volts to any other metric, such as pounds per square inch (psi), and a display. Convertor 3006 can be a voltage conversion device. In a preferred embodiment, convertor 3006 can comprise software, preferably LabView available from National Instruments of Austin, Tex. Convertor 3006 can further comprise a wire, a CPU, a memory, a program comprising a multiplier from volts to any other metric, such as pounds per square inch (psi), and a display.

Load 3008 can be any physical object exerting unknown force 900 as a result of gravity. Load 3008 can be a known or unknown load, such as an unknown object, upon force-receiving portion 122 directly or indirectly thereto. By way of non-limiting illustration, load 3008 can be a known product in the stream of commerce. By way of non-limiting illustration, load 3008 can be an object passing through a security checkpoint. It can be seen that many variations and applications would benefit from the present invention.

Platform 3010 can be one or more surfaces, such as ceramic, rubber, plastic, metal, or any other material capable of forming a surface. In an embodiment, platform 3010 can be a surface upon which objects can be placed while moving along conveyor 3000. By way of non-limiting illustration, platform 3010 can be formed with force-receiving portion rather than being attached to it. Platform 3010 being attached to force-receiving portion 122 such that the result is detection of weight and/or location. In a preferred embodiment, platform 3010 is formed with force-receiving portion 122 such that bending is more easily detected. In an embodiment, where platform 3010 is formed with force-receiving portion 122, platform 3010 can be any surface capable of having an object with unknown force 900 placed thereupon. Platform 3010 can be on, part of, hinged to, bolted to, removably attachable, or attached to L-beam 100. In an embodiment, platform 3010 can be integrated with force-receiving portion 122. In an embodiment, a plurality of platforms 3010 can form a conveyor belt. Leg portion 120 can be separate or fixed to a single movable belt.

Figure 31:
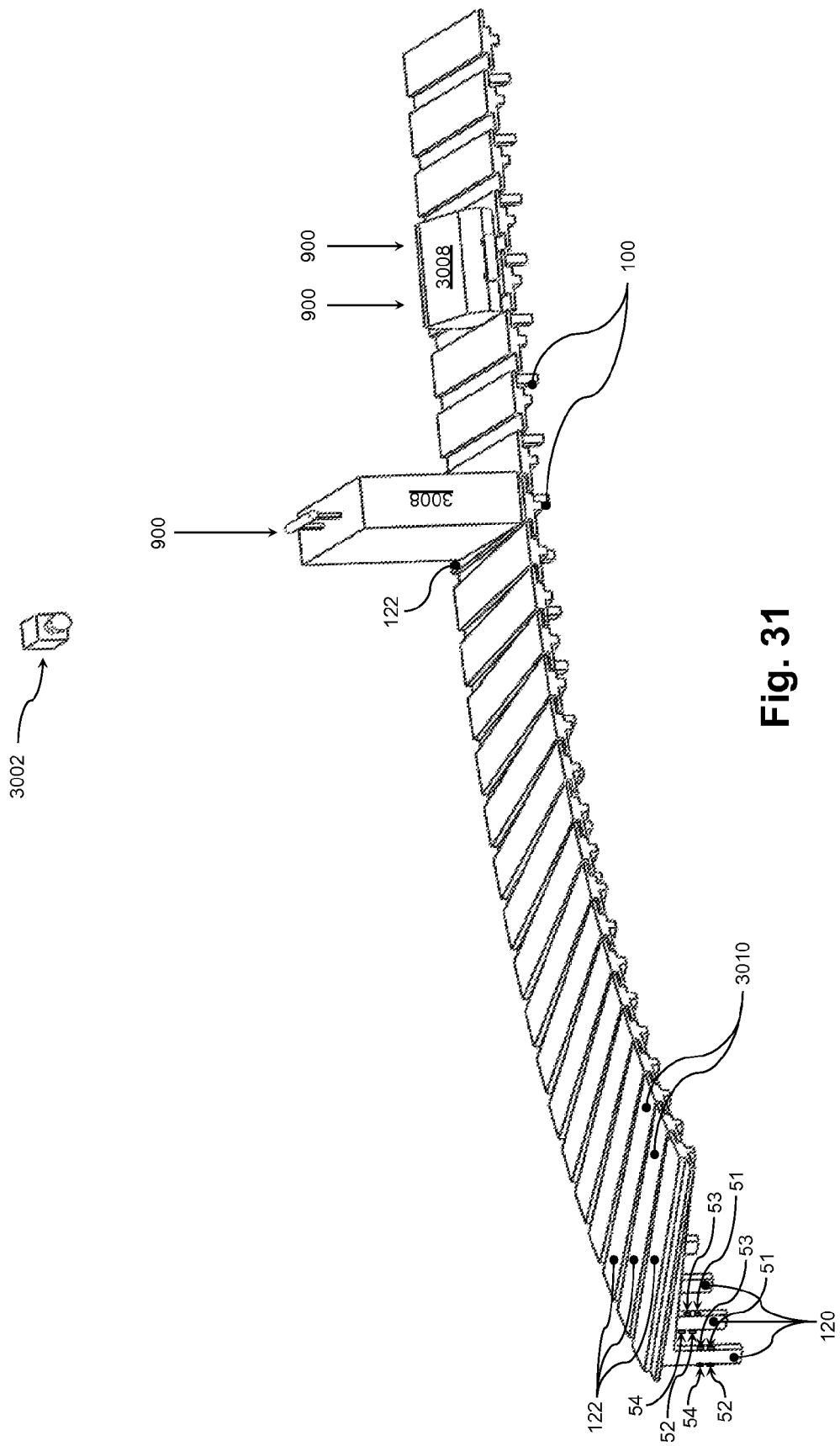
FIG. 31 shows an overall view of a possible embodiment of the present invention with conveyor and camera system.

FIG. 31 shows an overall view of a possible embodiment of the present invention with conveyor and camera system.

Conveyor 3000 is shown in FIG. 31, with plurality of L-beams 3002, camera system 3004, voltage convertor 3006, load 3008, platform 3010, sensors 51, 52, 53, and 54, L-beam 100, leg portion 120, force-receiving portion 122, unknown location 800, and unknown force 900.

Receive sensor input 3104 can be performed by any conductive material capable of providing respective voltages from sensors 51-54 and/or sensors 1701-1704, or any combination thereof. In an embodiment, receive sensor input 3104 can comprise a voltage multiplier software, by way of non-limiting illustration, using LabView from National Instruments of Austin, Tex.

The present invention can provide a weight and image tracking system. In an embodiment, the weight and image tracking system can have conveyor 3000, a first L-beam 100 having: a force-receiving portion 122 and a leg portion 120, at least two overlapping surfaces of conveyor 3000 resting upon or near the force-receiving portion 122, and one or more sensors 51-54 attached to the leg portion 120. Similarly, there can be a second L-beam with second force-receiving portion 122 and second leg portion 120. Further, there can be an imaging device and a memory, which is capable of storing an image of an unknown object upon force-receiving portion 122 or a platform upon it, such as part of conveyor belt. There can be a series of L-beams 100, each with pluralities of sensors 51-54 on each L-beam 100.

A benefit of the present invention can be to uniquely identify multiple items by location and weight once placed onto a structure or vehicle constructed with or from such an L-beam.

As items are placed onto a table or pallet suspended by plurality of L-beams 100 a processor could record their being placed and observe their being removed by co-operation with a camera or other camera system. The pallets or tables could be configured into a conveyor like device such as currently used to dispense luggage or a series of carts linked into a train. Such a device would be particularly useful in ensuring luggage is being claimed by the correct persons or to track a suspected wrongdoer, person of interest, or potential smuggler of a linked package between couriers and then visually identifying the persons and/or their prior whereabouts, including monitoring actions leading up to or after any transaction which can be traced to the weight tracking capabilities of the present invention. Depending on the achievable precision of a given implementation of the present invention, it can be seen seen that it could be possible to uniquely identify many items of passenger luggage, no two having exactly the same weight, and no two having the same location. Note also that the non-limiting FIG. 31 showing L-beam indicates its inverted position compared to prior non-limiting examples. It will work essentially the same other than what were compressive strains in the predominantly vertical portion of the L-beam are now tensile strains, and vice-versa. L-beam 100 can be relatively narrow and with overlap (FIG. 30) allowing a plurality of L-beams 100 to be retrofitted to common luggage conveyor systems which have curves. The same technique could be applied to inventory control and tracking in a warehouse or store where the shelving would be constructed via a plurality of L-beams 100 which communicate to a processor, which may also be connected to a camera system.

In an embodiment, L-beam 100 can be arranged for shelving, for example, in a hardware store.

L-Beam 100 can have hooks 3010 on leg portion 120 which can be inserted into vertical bars 3012 via slots 3014.

A benefit of L-beam 100 can be to provide modular or hangable shelving.

In an embodiment, store or warehouse can have L-beam 100 with leg portion 120 and sensors 51-54 connected to output to a CPU.

As a widget is loaded, data can be generated. For example, fifteen widgets can be found at a given location.

In a fork truck embodiment, a driver can access the load and then tilt back the L-beam 100.

In a method of the present invention, L-beam 100 can access 3100 a load having unknown force 900. Access 3100 can involve obtaining the load onto any structure upon which L-beam receives force on the force-receiving portion 122.

In many vehicle applications, L-beam 100 can be at almost any angle at a given time, given varying road conditions.

In refuse applications where L-beam 100 is attached to a refuse vehicle, sometimes trash containers can be accessed from an off-angle condition.

Force-receiving portion 122 can overlap with other force-receiving portions 122. By way of non-limiting illustration, platform 3010 formed with force-receiving portion 122 can have an overlapping surfaces. In an embodiment, load 3008 can provide unknown force 900 on a plurality of L-beams 100 each having force-receiving portions 122, and preferably leg portion 122 with sensors 51-54. Weights and locations can be used in instances where two or more L-beams receive unknown force 900.

Figure 32:
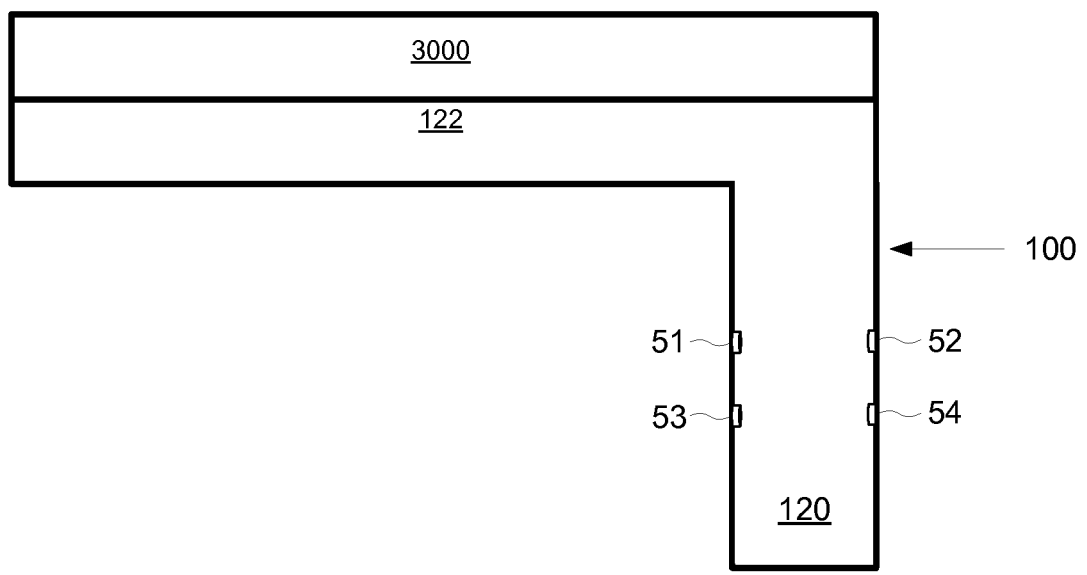
FIG. 32 shows a flat side view of a possible embodiment of the present invention with platform.

FIG. 32 shows a flat side view of a possible embodiment of the present invention with platform.

L-beam 100 is shown in FIG. 32, with sensors 51-54, leg portion 120, force-receiving portion 122 and platform 3010.

In a preferred embodiment, platform 3010 can be formed with force-receiving portion 122. Platform 3010 need not be limited to embodiments placed on or attached to force-receiving portion 122.

Figure 33:
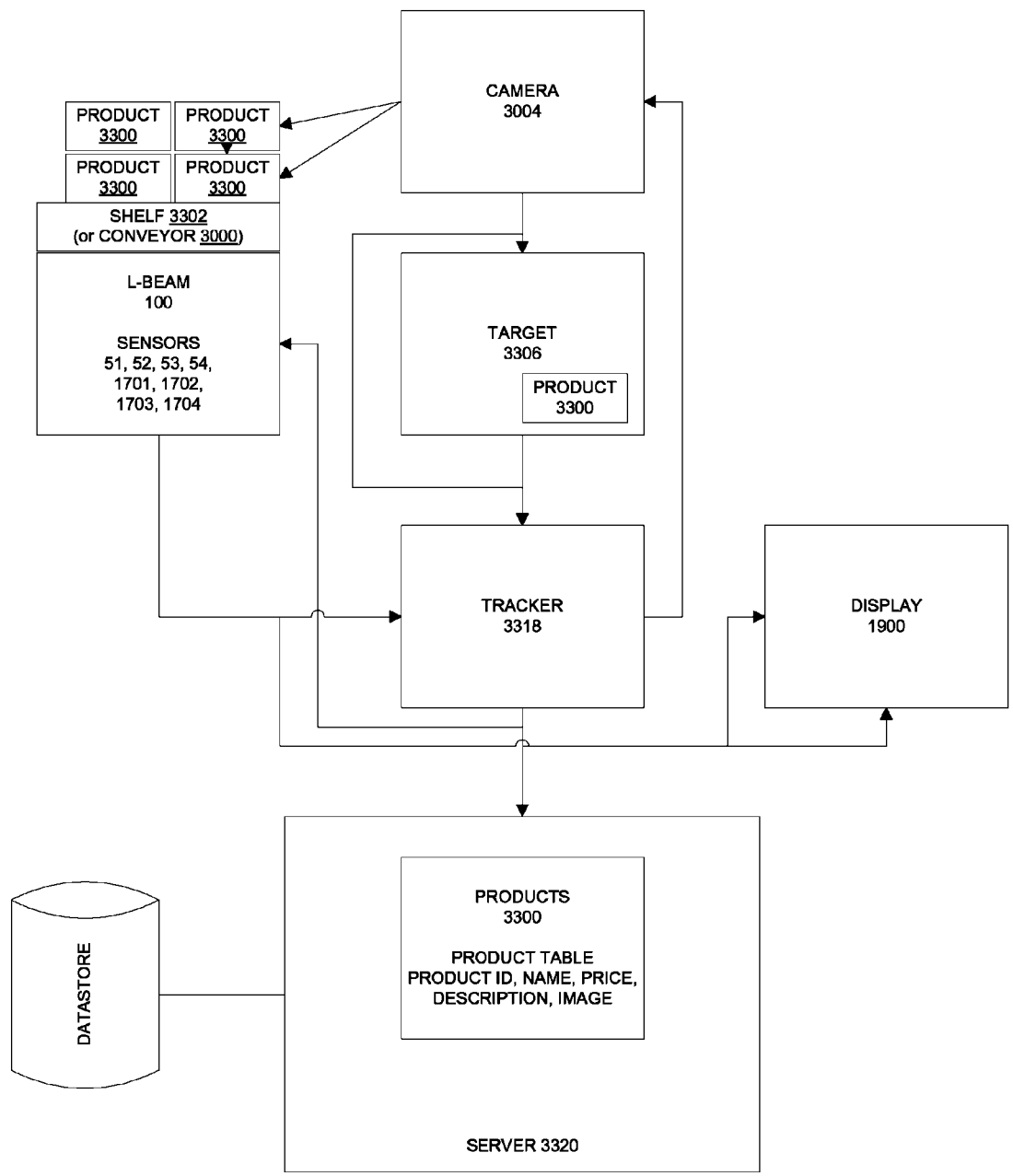
FIG. 33 shows a schematic diagram of a possible embodiment of the present invention for item monitoring with a camera system.

FIG. 33 shows a schematic diagram of a possible embodiment of the present invention for item monitoring with a camera system.

Camera 3004 is shown in FIG. 33, with product 3300, shelf 3302, target 3306, monitored area 3308, smart store 3310, target 3312, consumer preferences 3314, or purchasing suggestions 3316, tracker 3318, server 3320, and L-beam 100.

Shelf 3302 can be a rack, board, or any surface upon which one or more products can be placed. A conventional shelf is generally lies planar to the ground. Shelf 3302 can incorporate any scale, including by way of non-limiting illustration, one or more cantilever beams (U.S. patent application Ser. No. 11/010,161 to Coleman, filed Dec. 13, 2004 and allowed on Jan. 4, 2013), or one or more L-beams 100 can support shelf 3302, inverted or not inverted. In an embodiment, shelf 3302 can have a pair of inverted L-beams 100. In an embodiment, L-beam 100 can have hooks on leg portion 120. In an embodiment, L-beam 100 can be stackable, hollowed, or flanged. Shelf 3302 can have L-beam 100 integrated into its structure such that sensors 51-54 can be on two integrated L-beams 100. In some embodiments, one or more L-beams 100 can comprise shelf 3200 itself.

Monitored area 3308 can be an image of a physical area capable of being stored in a tangible medium on server 3320 and/or observable via camera 3004. Monitored area 3308 can include, by way of non-limiting illustration: region, room, store, warehouse, facility, shelf, shelf 3302, L-beam 100, container, or storage area, or any portion thereof, or any multiple or combination thereof.

Smart store 3310 can be a physical location having an L-beam 100 and shelf 3302. In some embodiments, smart store 3310 can also have camera 3004. A benefit of the present invention in embodiments with smart store 3310 can be to capture and respond to changes in force applied to L-beam observed through sensors 51-54.

Target 3312 can be any physical object, which can be the subject of tracking via its image, generally as seen through a camera, such as camera 3004. Target 3312 can be a stationary product 3300 on shelf 3302. Target 3312 can be modified to include a person who picks up product 3302. Target 3312 can include the image of a person and product 3300 together as multiple targets jointly associated, or as multiple targets 3312. A possible implementation of target 3312 can be to programmatically tag, at an initiated time either automated when the product 3300 is picked from shelf 3200, and by monitoring one or more pixels, or a color and initial area of pixels, as viewed through camera 3004, and comparing from a first frame to a second frame the series of images and how such target 3312 has moved. Thus, a benefit of the present invention can be to track a person who has picked up a given product as they move from one part of the store or location to another via camera 3004. Programmatic instructions to track target 3312 can be executed on one or more servers 3320. Configuration of target can be performed when initially configuring the smart store 3318.

Consumer preferences 3314 can be a record, datastore, or collection of information or data pertaining to historical information about one or more consumers, a group of consumers, or categories delineated by product pick, categories associated with a product pick, likely demographic information associated with a product pick, time, geography, or demographic information.

Purchasing suggestions 3316 can include any offer, proposed item for purchase, product promotion, or point of sale in the retail location.

Tracker 3318 can be provided on server 3320. Tracker 3318 can include image processing software used with visual image processing, including any still images, series of still images, vector-based moving graphics, video, regardless of format. By way of non-limiting illustration, tracking system can Server 3320 can have a computer processor, a memory coupled thereto, and an operating system. Server 3320 can be software-based, or hardware-based. In hardware-based server embodiments of the present invention, server 3320 can include, by way of non-limiting illustration, any hardware computing device, desktop, rackmounted, or mobile. Camera 3004 can communicate to server 3310 over HTTPS or unsecured protocols, over any wireless or wired communications medium. There can be one or more servers 3320, or server 3320 can be hosted in a cloud. Preferably, server 3320 can be a locally hosted computer to reduce network lag and thus provide more reliable and more timely information. However, to balance service and connectivity, server 3320 can be distributed with multiple components hosted in different physical locations or on different physical machines. Thus, a notification process can be on a different physical machine from an image processor, to balance load. Further, a server 3320 can have increased RAM and/or graphics acceleration hardware to assist in processing and/or displaying ongoing monitoring in a security monitoring chamber or provided via one or more on-screen monitor panels for viewing. A user interface can be provided to permit zoom, time manipulation to speed up, slow down, rewind, fast forward, play, pause, view live feed, etc. Tagging pixels via an administrative user interface can include, by way of non-limiting illustration, selecting a pixel or group of pixels corresponding to one or more products 3300 as viewed through camera 3004. Server 3320 can have one or more datastores, which can include in-memory storage for ongoing processing, a database, including but not limited to MySQL, Oracle, Microsoft SQL server, or a data warehouse and business intelligence software, flat file storage space, local or residing in the cloud.

A weight-sensing storage system capable of tracking removed items can comprise an at least one product image captured via an at least one camera, a plurality of sensors on an L-beam, sensing a reduction in weight from the L-beam, the sensing determined by a first signal from the plurality of sensors indicating a first state prior to change of the at least one product image and a second signal indicating a lower strain on the L-beam than the first signal. Further, the weight-sensing storage system can also generate a wireless message including a product identifier selected from one of the following: product SKU, product ID, product name, product description, product location, a product-order ID, a product-inventory ID, or any plurality or combination thereof, and can generate a record with the product image taken via a camera. In addition, the weight-sensing storage system can generate records pertaining to a change in weight, for example, programmatically recording a product identifier corresponding to the product which was removed from a shelf, with a first or initial timestamp corresponding to when the product was removed from the shelf. By way of non-limiting illustration, a digital dashboard can provide various metrics, including but not limited to: pick vs. purchase rates for certain in-demand products, returns vs. picks vs. purchases, weight discrepancy frequency reports, shelf utilization reports, shelf pick rates vs. multiple product pick rates per shelf, and shelf vs. shelf pick rates across multiple stores. All such metrics or reports can be based, in whole or in part, on information obtained from L-beam 100. After sensing a reduction in weight from the L-beam, which can be obtained via the plurality of sensors, a recording can be initiated, to record of an image of the product at the time of removal from the shelf, which can be monitored or recorded via the camera. After sensing a reduction in weight from L-beam 100, the present invention can initiate a video recording of an image of the product 3300 at the time of removal from the shelf via camera 3004. The video recording can be initiated at the time of weight change of monitored area 3308. Furthermore, the weight-sensing storage system can send a wireless message or communication, including but not limited to: SMS, MMS, text message, iMessage, or any other communication. Such wireless communication can include, by way of non-limiting illustration: a product image, wherein the message indicates and an indication of a loss, actual or prospective. The loss can be indicated by price, or simply an indication of concern that the associated product will be lost or has been lost, or is simply the subject of interest for potential investigation, recovery, or loss prevention. Also, the present invention can measure the difference in weight between the removed product and a known product weight. Additionally, the present invention can send a notification upon expiration of an expected time to checkout. The notification can have, by way of non-limiting illustration: a product identifier, an at least one selected from: an image, a video, or a text message.

In an embodiment, there can be a method to reduce risk of loss prevention, which can include: storing product 3300 on a shelf 3302 where product 3300 can have a known weight K; removing a weighted object from a store rack where the rack has at least one L-beam 100 to facilitate detecting the weight of product 3300. There can be multiple products on the shelf each having approximate weight corresponding closely to known weight K and having a sum of weights for multiple products 3300 on shelf 3200, which can later be used to determine how many products 3300 were removed by subtracting the difference before and after removal of the products 3300. If one product 3300 is removed, the weight can be subtracted from the shelf 3302 total.

In an embodiment, a product 3300 can be removed from the store rack or shelf 3302, and thus the "smart store" can track when product 3300 taken off shelf 3302. In a possible embodiment, there can be a programmatic instruction to expect the removed product 3300 to go through at the cash register; if not, the removed product 3300 can be suspected as stolen, lost, or misplaced. Subsequently, a report can be generated by server 3320 to a store manager for review and dissemination to the appropriate party, ranging from a private investigation entity, law enforcement, distributor, sales agent responsible for the given product 3300.

If product 3300 is initially designated as misplaced but not recovered within a specific period of time, for example, within four hours, or after four hours into the following shift (12 hours, if eight-hour shifts, for example), then the product can be reported as lost and suspected as stolen.

In an embodiment involving security tracking, camera 3004 can track a product being picked up or removed from its storage location, i.e., shelf 3302.

In an embodiment involving physical items, including retail stores, if a person does not take the product they previously removed through the cash register, a notification can be sent. Error cases can be established for a given retailer, warehouse, or for a specific camera 3004, or any plurality or combination thereof. By way of non-limiting illustration, there can be a change in weight on L-beam 100 or shelf 3302 but a lack of correspondence with an expected removal weight, approximately equal to the known weight of the product. This can be caused by wrong product on the shelf being removed, having a different weight, which can be adjusted for within the system if known adjacent or nearby products are found. A message can be generated to provide notice of an indeterminate weight condition for other cases where there is a weight discrepancy not easily resolved, such as a person leaning on a shelf or product falling from one portion of a shelf to another. Further, a shelf 3302 turned on its side can serve as an in-between-shelf border, to limit mixing of products, thereby increasing reliability of the present invention.

If the removed product is deemed a loss, an order can be prepared to replace the removed product. If too much removed product is lost, an alert can be generated and/or a report produced and sent to a third party.

Camera 3004 can assist in: acquiring target 3306; following target 3306; and a notification can be sent when the removed item 3300 or a product with matching product ID is paid for at the register or checkout, per a transactional data sent from the checkout terminal (i.e., when scanned or otherwise indicated as checked out).

Following a target image can be an ongoing process. Camera 3004 can monitor a group of items at a location, for example, on a shelf, in a box, or on a shelf in a box, or on a palette.

Camera 3004 can provide a visual output to be analyzed for differences from a first image and a second image at a later point in time, preferably close in time such as within a few seconds. Camera 3004 can then be instructed by the system to adjust its view of the removed product to follow the removed product. An image of a person who is associated with the removed product can be recorded via camera 3004 placed in a datastore.

By way of non-limiting illustration, camera 3004 can acquire and watch one or more targets 3312 in a given monitored area 3308. Subsequently, when product 3300 is removed from shelf 3302, the tracker 3318 can determine that one or more products 3300 is or are off the shelf 3302, given that a weight change occurs on L-beam 100 which can be sensed via sensors 51-54 at two times, a first time and a second time, and the respective signals corresponding to the weight on one or more L-beams 100. If a coupon item is known, then multiple products 3300 can be determined to be lifted from shelf 3302. Further, upsell or cross-sell suggestions can be made visually via in-store display or via audio, or via automated wireless communication to an individual's mobile device, to a shopper advising of further deals, such as multi-item discounts for bulk purchases or multi-product purchases, based on the collected data reflecting the picking off the shelf a plurality of products 3300 which can be ascertained by sensors 51-54. Further, timer to check the object whether it shows up on another shelf or the checkout In an embodiment, camera 3004 can receive an image of a new person of interest when the person enters into a designated monitored area, such as through the entrance of a physical location or passing from an adjacent area into monitored area 3308.

Subsequently, a person can pick up a product 3300, while the system is watching via camera 3004. The system expects the person to pay for the product 3300 unless it is subsequently relinquished, either by returning it to the original shelf 3302, leaving it on another shelf 3302 or on the floor 3302, giving it to another person such as an employee or manager. Cases of high risk can be assisted in being identified, and thus a benefit of the present invention can be to immediately provide information to respond to a threat or occurring crime, or to learn about potential repeat attempts of theft. Such theft can also be monitored across multiple locations or for certain products.

In an embodiment, there can be a tracker 3318, which can record one or more instances when a product 3300 taken off shelf 3302. Tracker 3318 can then take further action or automatically provide information to a recipient. By way of non-limiting illustration, once a product 3300 is removed, the tracker 3318 can expect it to go through at cash register if not something is suspected as stolen.

Further, camera 3004 can monitor a product stored on the shelf 3302. Subsequently, product 3300 can be picked up and monitored via camera 3004. Software to acquire and target an object are known in the related art. Based on the teachings of the present invention as disclosed, and consistent with this specification, one having an ordinary level of skill in the pertinent art would know how to incorporate camera 3004 and targeting software to acquire and target a product image 3300 which can be initially stationary, and subsequently removed from shelf 3302. Target 3312 can include any physical object, ranging from products to persons.

If the product 3300 is not processed at the checkout register, then further action can be taken by the present invention. By way of non-limiting illustration, further action can be to automate a process, or to automate and facilitate a human response to given error cases by providing timely and sufficiently detailed information based on data recorded by the present invention. By way of non-limiting illustration, error cases can include, by way of non-limiting illustration: missing from the shelf for longer than the expected period, returned to shelf, missing but not urgent, missing and urgent, identify person of interest, notify shift manager, notify next shift manager, inquire previous shift manager or employees, confirm with restocking personnel, locate suspect with image of suspect and time removed from shelf, begin or continue monitoring product or person(s) of interest, or suspect. Further, such messages can be provided in localized languages appropriate for specific persons. In an embodiment, language switches can be used for dual language or multi-lingual notification of automated messages. Moreover, an error tolerance range (e.g., 1% to 5%) for weight discrepancies can be helpful to reduce or eliminate instances of over-alerting or false positives. This can change from product to product, depending on manufacturer consistency. Thus, a benefit of the present invention can be to catch a higher rate of non-conforming products 3300 given irregular weight discrepancies beyond a tolerance range, e.g., before such product 3300 is released to consumers, or after shelving and re-shelving of a given product 3300.

By way of non-limiting illustration, product 3300 can be ordered to be replaced at a certain quantity "Q" if the product 3300 was purchased at checkout and the current quantity "M" is below acceptable safety threshold "P" of the given product 3300. Ordering replacement product can occur upon simultaneously satisfying a checkout order for a removed product when the quantity on hand for the given product ID dips below the level of pre-established re-ordering quantity Q. The pre-established re-ordering quantity can have a default quantity captured simply as an integer or numeric value. There can also be a re-order amount, such as a prior amount or a contractual amount to be restocked or re-ordered. The instruction can then be: if current quantity on hand "M" equals safety threshold amount "P" then re-order "Q" amount of product. If re-stocking can occur without producing a re-order, then no order will be produced. Instead, the nearest warehouse with the product on hand will be instructed via a notification to either supply the quantity, or to directly restock the shelf (for on-site warehouses or storage room where additional product is kept "in the back of the store" for example).

In another embodiment, an automated restocking robot can be used to pull product off one shelf 3302, thus being detected by L-beam 100 and its respective sensors 51-54, and placed on another shelf 3302 thus being weighted down further and then detected by another L-beam 100. Such shelf can be in any location, such as a palette, warehouse shelf, or another retail shelf. A benefit of the present invention can be to streamline re-stocking procedures to cut down on unavailable products, particularly such products which may be in demand by consumers. Another benefit of the present invention can be to reduce costs associated with restocking or reordering products while detecting with greater precision the quantities deducted and then increased during the restocking process.

Acquiring target 3312 can be performed by programmatically configuring camera 3004 to capture images when L-beam 100, specifically the sensors 51-54 or 1701-1704 thereto, are affected by a change. That change can reflect when a customer picks a product 3302, which therefore has an approximate weight, which can be compared to a known weight to determine a quantity of the picked product 3302. Further, data capture from sensors 51-54 or 1701-1704 can also be performed, for example, using third party software or proprietary signal interpreter and logging, for example, via LabView software. The acquired sensor data pertaining to product weight on the L-beam 100 or overall shelf 3302 can then be recorded programmatically. By way of non-limiting illustration, recording can be performed by noting the time, product's shelf location meaning where the shelf is located, or any designation pertaining to the location and including print (weight) and/or compareWeight(new weight, prior weight) or checkWeight(time2, newWeight, time1, priorWeight) to a file and/or inserted or updated in a SQL database, or directly incorporated into a subsequent notification. The image of the acquired target 3312 can also be recorded and compared at two different times, before and after the item 3300 is removed.

Following target 3312 can be performed by using tracker 3318, which can receive one or more inputs associated with product 3302, identify target 3312, consumer preferences 3314, or purchasing suggestions 3316. In a possible embodiment, an in-store target 3312 can be followed outside of the retail location into the parking area, by passing on such information to external recipients to apprehend a suspect for shoplifting or to detain such suspect for a reasonable but short time to determine whether such product was in fact stolen or not. If such product is deemed stolen, the relevant portions of video footage from camera 3004 can be cut automatically into an mp4 file with or without sound. The video footage can be recorded with plain view, infra red, or alternative views of the removed product and the suspect who has failed to pay for the removed product after exiting the store or passing through the checkout area without providing payment or at least attempting to complete a transaction. White balance can be established to configure according to changing lighting conditions periodically. In cases where a customer cannot afford to make a payment at checkout, the products noted as removed can be temporarily placed on hold pending restocking from the checkout area back to the shelf or to a separate location, and the alert for the removed product can be diffused or disengaged such that no further action is deemed urgent, other than a responsive restocking resulting from a message from the system to a designated employee, or the same alert procedures can be initiated.

Notifying can be performed upon any data interaction or determination of certain criteria. By way of non-limiting illustration, when the removed product is paid for, a message can be generated automatically to send any relevant information to a recipient, including any product-related information about the product which has been lifted off the shelf or L-beam. In some embodiments, a monitoring and notification process can include: a periodic structured query language (SQL) query executed on a database, relational or non-relational. Payment or checkout can be the point at which a triggering message to the listener can conclude positive checkout. Integration with a checkout system can include monitoring or having a listener or a data-level change to conclude checkout. The known product ID can be stored in the database and compared to the product ID of the picked product 3300 to attempt to achieve a match. Further, there can be an ongoing service actively running on a Windows operating system executed by a third party executable with a parameter passed through it and then receiving its output in memory or written to a flat file in text with any character format, for example, in ASCII or UTF-8 for U.S. English localized implementations. The text file can be monitored, for example, repeatedly or periodically for changes ranging from every 0.001 to 60 seconds, or using larger intervals ranging into hours or days. In a possible embodiment using a push approach, when the product is paid for at checkout, then the given product with or without RFID can be designated as purchased and no security check need be continued. If the product is paid for but a product is returned to the shelf, the system can have a non-urgent message or notification to the manager indicating that there is extra product on shelf for the given product. One of ordinary skill in the pertinent art would know how to implement the notification system based on the present disclosure consistent with the present invention.

By way of non-limiting illustration, there can be a SQL query similar to the following: 'SELECT (PRODUCT_NAME) FROM SHELF WHERE CURRENT_WEIGHT<RESTING_WEIGHT AND WHERE PRODUCT_ID=[MONITORED_PRODUCT_ID] AND WHERE CHECKOUT=TRUE.' The given monitored product ID can correspond to the given removed product ID. The resting_weight can correspond to the known weight prior to removal of product 3300. The current_weight can refer to the weight after removal of product 3300.

Following a target image can include acquiring the target 3312, noting the product 3300 which was removed, and then creating a waiting process 3314 which can count down a duration in which a default length of time passes, in which to conduct a checkout for the product 3300 unless the product 3302 is returned to the shelf 3302. In a possible embodiment with no images of a person removing the product and only weight sensing L-beam 100, it is possible to still initiate procedures for monitoring and tracking product as it leaves the store. It is also possible to designate a product as misplaced. By way of non-limiting illustration, if product 3302 is detected on another shelf 3302, then the product 3302 can be deemed misplaced instead of stolen. It is also possible that a given product may be partially consumed (i.e. eaten, used, or otherwise consumed) before it is returned to the shelf and potentially may have an improper weight upon its return to the shelf. In an embodiment, product 3302 can have a weight that is within 5% of its original weight. It is also possible to factor indoor temperature and expected changes in weight if any, potentially due to minor fluctuations from evaporation, spoilage, spillage, or condensation.

In a possible embodiment, a message can be electronically or wirelessly communicated to a given entity or person that target 3312 has been acquired and copy an image of that target 3312 to be sent to their device for fair purposes of security monitoring. Each removal of each product can be tracked within the store and automatically recorded with an image of the person who is removing the item, or if automated, then each removal of each item by the automated arm or lift when such removed is detected via camera 3004. Messages can range from indications of low stock, re-order suggestions, suspected theft, misplaced product, etc. In an embodiment, message can indicate the product identifier. Product identifiers can be any of: product SKU or ID, product name, short or long description, product image, camera product images associated with the product, store location, manufacturer or brand, order number, inventory information such as quantities in store and/or in warehouse, re-order information, recall information, shelf location of the product, price, expiration date if applicable, or any combination thereof. Further, the time it was removed from the shelf as well as the current time of the notification being generated can be provided in a subsequent message, report, notification, or alert.

A benefit of the present invention can be to provide improved security for products or items, and information systems to track and resolve checkout for products picked off the shelf.

A benefit of the present invention can be to provide automated assistance in creating pertinent and timely messages to appropriate persons to take corrective action.

A benefit of the present invention can be to maintain a historical record pertaining to product patterns in retail or supply chains, or to optimize operations research, by way of non-limiting illustration, including: reordering of products, recall of products, pick patterns by consumers and failed purchase decisions, times when products were approximately taken off the shelf, comparisons to store entry time, entry in the monitored area 3308 to time-to-pick off the shelf 3302, etc.

A benefit of the present invention can be to provide an analytic quantitative and qualitative data collection pertaining to consumers and respective interest areas, product picks, failed checkouts, and purchase history of product 3302, from the time product 3302 is picked from shelf 3302 and subsequently purchased—thus providing a basis for consumer behavior analysis on a wider and more detailed scale with automated time logging to determine additional metrics for potential quality improvement.

In an embodiment, camera 3004 can watch target 3306. Thus, a benefit of the present invention can be to detect when an object is off the shelf, and/or its current location, and/or to record an image of the person who removed the given product 3300 off the shelf 3302 while noting the time, and the lapse of expected time after which a report or notification can be provided to an appropriate person. In an embodiment, a timer can be used to check whether a prior picked up object later shows up on another shelf or the checkout. Target 3306 can be any of the following: the moved product 3300, the person who moved the product or was in close proximity to the product, or any combination thereof.

In a preferred embodiment, the present invention can combine camera 3004, L-beam 100, and shelf 3302.

Smart store 3310 can detect a change to a known image of a monitored area 3308, such as a portion of public or private property or structure. In a possible embodiment, person of interest's image via camera 3004 can be monitored as a target 3306 can enter the monitored area 3308. Smart store 3310 with camera 3004 can detect when a person picks up an object, such as a component or a product off a shelf having L-beam 100. Camera 3004 can photograph and/or record a video with or without sound. A benefit of the present invention can be to anticipate or expect that a payment for the product will occur, and if not, then the product may be investigated for theft and restocking procedures such as alerts, notification, and/or reports or orders may be initiated, processed, and sent to external third parties or internal decision makers.

By way of non-limiting illustration, there can be a real-time operational database and interfaces to retrieve information, such as location and/or weight. Using third party software or custom program instructions, application program interfaces can implement a means to getLocation and getWeight in the L-beam system/apparatus or method. Such "get" programmatic instructions can be automatically fed to a display without initiating a separate command in the user interface. Therefore, a listener can be instantiated to obtain the current location information from the sensors 51-54 and/or 1701-1704, each having its own corresponding inputs.

In a preferred embodiment, a timestamp can also be included while four simultaneous inputs are processed. In another embodiment, the timestamp can be produced and returned when the four inputs are obtained. In yet another embodiment, pairs of input information are simply obtained for basic comparison (left/right lateral differences can be derived from the sum of the proximal and distal sensors a first L-beam, and the other sum based on the proximal and distal sensors on a second L-beam, where the first and second L-beams 100 comprise a pair of L-beams 100. To summarize an API of a possible embodiment, by way of non-limiting illustration:

```
getLocation(beamOneProximalSensor, beamOneDistalSensor,
beamTwoProximalSensor, beamTwoDistalSensor)
{
/* By way of non-limiting illustration, each input above in this
getLocation( ) method can refer to sensors 51-54 and their respective
inputs, preferably in real time. */
    base = 4 // for example the force-receiving portion 122 being
    height = 2 // for example the leg portion 120
    constant Nc = 1/12*base*height^3
}
getLocationTime(time, beamOneProximalSensor, beamOneDistalSensor,
beamTwoProximalSensor, beamTwoDistalSensor, Nc) /* This method, by
way of non-limiting illustration, can permit using time as a prerecorded
input from an external source, such as LabView */
getWeight(beamOneProximalSensor, beamOneDistalSensor,
beamTwoProximalSensor, beamTwoDistalSensor)
getWeightTime(time, beamOneProximalSensor, beamOneDistalSensor,
```

```
-continued beamTwoProximalSensor, beamTwoDistalSensor)
  displayLocation{ getLocation }
  checkLocation( ){
    // if OffCenter(s1, s2, s3, s4) == true
    {alert(OffCenterWarningMessage)};
  }
  displayWeight{ }
  compareWeight( )
  flag Product( )
  trackPersonOf Interest( )
  takePhoto(time,image)
  recordVideo(initial time){
    // write to file [date-time.mp4]
  }
  balanceWhite( )
```

CONCLUSION

In summary, the present invention provides a force-sensing method comprising bending a L-beam acted on at an initially unknown location on a force-receiving portion of the L-beam, the L-beam having a known geometry, a known material, and a leg portion, where the leg portion comprising a tension side and a compression side, measuring tension-side strain via a first sensor and a second sensor, measuring compression-side strain via a third sensor and a fourth sensor, determining local stress based on the known geometry and the known material, and reading an output. The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A force-sensing and location-sensing method, comprising: bending a force-receiving portion of an L-beam; measuring tension-side strain via a first sensor and a second sensor on the tension side of a leg portion; measuring compression-side strain via a third sensor and a fourth sensor on the compression side of the leg portion; determining local stress based on the known geometry and the known material; and resolving an unknown force on the force-receiving portion of the L-beam;
where the first sensor measures local strain;
a first pair of lateral sensors on the leg portion of the L-beam and a second pair of lateral sensors on the leg portion of the L-beam, where the first and second pair of sensors are perpendicular in orientation to the first, second, third, and fourth sensors;
where the first, second, third, and fourth sensors are capable of sensing strain on the leg portion caused in part by an unknown force on the force-receiving portion of the L-beam; and
where an unknown location of an applied force on the force-receiving portion of the L-beam is resolved by measuring tension and compression on the leg portion of the L-beam.

2. the method of claim 1, wherein the L-beam comprises: a known geometry, and a known material; and where the leg portion comprises: a tension side and a compression side.

3. the method of claim 2, where each sensor is a Wheatstone bridge.

4. the method of claim 3, where the unknown force is measured in local units of stress.

5. A stress measurement system to determine force or location on an L-beam, comprising:
a force-receiving portion; a leg portion comprising a tension side;
a first sensor on a tension side of the leg portion, where the first sensor measures local strain;
a second sensor on a tension side of the leg portion;
a third sensor on a compression side of the leg portion;
a fourth sensor on the compression side of the leg portion;
a first pair of lateral sensors on the leg portion of the L-beam and a second pair of lateral sensors on the leg portion of the L-beam, where the first and second pair of sensors are perpendicular in orientation to the first, second, third, and fourth sensors;
where the first, second, third, and fourth sensors are capable of sensing strain on the leg portion caused in part by an unknown force on the force-receiving portion of the L-beam; and
where an unknown location of an applied force on the force-receiving portion of the L-beam is resolved by measuring tension and compression on the leg portion of the L-beam.

* * * * *